US007046153B2

(12) United States Patent
Oja et al.

(10) Patent No.: US 7,046,153 B2
(45) Date of Patent: May 16, 2006

(54) TRACKING DEVICE

(75) Inventors: Raymond G. Oja, San Pedro, CA (US); Roger A. Moore, Running Springs, CA (US); Milton E. Hamilton, Glendora, CA (US); Michael Hreha, Oceanside, CA (US)

(73) Assignee: VitalTRAK Technology, Inc., Manhattan Beach, CA (US)

( * ) Notice: Subject to any disclaimer, the term of this patent is extended or adjusted under 35 U.S.C. 154(b) by 284 days.

(21) Appl. No.: 10/096,104

(22) Filed: Mar. 13, 2002

(65) Prior Publication Data

US 2002/0175820 A1 Nov. 28, 2002

Related U.S. Application Data

(60) Provisional application No. 60/275,519, filed on Mar. 14, 2001.

(51) Int. Cl.
*G08B 23/00* (2006.01)

(52) U.S. Cl. ............................... 340/573.4; 340/539.1; 340/539.15; 340/539.19; 340/539.23; 340/825.69; 340/825.72

(58) Field of Classification Search ............ 340/573.1, 340/539, 539.1, 535.15, 573.4, 539.15, 539.19, 340/539.21, 539.23, 825.36, 825.69, 825.72, 340/571, 568.1
See application file for complete search history.

(56) References Cited

U.S. PATENT DOCUMENTS

| | | | | |
|---|---|---|---|---|
| 5,086,290 A | * | 2/1992 | Murray et al. | 340/539.13 |
| 5,430,775 A | * | 7/1995 | Fulghum et al. | 375/134 |
| 5,479,932 A | * | 1/1996 | Higgins et al. | 600/529 |
| 5,661,460 A | * | 8/1997 | Sallen et al. | 340/573.4 |
| 5,812,056 A | * | 9/1998 | Law | 340/539.15 |
| 6,078,260 A | * | 6/2000 | Desch | 340/573.1 |
| 6,265,974 B1 | * | 7/2001 | D'Angelo et al. | 340/568.1 |

* cited by examiner

*Primary Examiner*—Hung Nguyen
(74) *Attorney, Agent, or Firm*—Donn K. Harms

(57) ABSTRACT

A monitoring and locating device includes one or more remote child units and a parent unit in communication with each of the child units. The parent unit is adapted to assign and transmit an individual identifier to each child unit. The parent unit is constructed and arranged to continuously monitor each of the child units by transmitting and receiving signals to each of the child units using the individual identifiers assigned thereto. The monitoring and locating device may be used in a method for monitoring and tracking a living entity that includes acquiring the plurality of child units using the parent unit based at least in part on user input. Monitoring each of the plurality of child units individually with the parent unit. Tracking the location of each child unit with the parent unit and locating a selected child unit of the plurality of child units with the parent unit based upon the tracked location thereof.

8 Claims, 29 Drawing Sheets

TRACKING DEVICE

This application claims benefit of provitional application 60/275,519 filed Mar. 14, 2001.

BACKGROUND

1. Field of the Invention

The present invention relates generally to tracking and locating objects and people. More specifically, the invention relates to a device and method for monitoring, tracking and locating an object or person, such as a child.

2. General Background and Related Art

Sometimes, when subjected to some adult activities such as shopping, a child may become curious or restless. The child may have a tendency to wander. In a matter of seconds, while the parent or guardian is distracted, a child can move quickly out of sight and become lost. In most instances, the child is nearby but merely out of sight, however, in other cases, the child may be placed into danger.

To this end, monitoring and locating devices are used to quickly locate lost children. Some types of monitoring and locating devices, usually the wireless applications of the devices, include a transmitter which is positioned on the child such as, for example, around their wrist or ankle. The transmitter transmits location signals. Typically, a parent or guardian uses a receiver to receive the transmitted location signals from the child's transmitter to locate the transmitted signal, which in turn, leads them to their lost child.

In some cases, a number of such wireless devices may be used within close proximity of other similar devices, such as, for example, in a shopping mall or an amusement park. In these cases, interference among the devices may be possible, which would render the devices inoperable and useless in locating lost children.

Consequently, there exists a need in the art to provide a monitoring and locating device capable of monitoring and locating an object or person, as well as being able to operate in close proximity to other monitoring and locating devices.

The inventions claimed and/or described herein provide a tracking device which comprises one or more portable remote units (child units) and a control unit (parent unit) in radio frequency communication with each of the child units. The control unit is adapted to assign and transmit an individual identifier to each portable remote unit. The parent unit is constructed and arranged to continuously monitor each of the child units by transmitting and receiving signals to each of the child units using the individual identifiers assigned thereto.

The parent unit can be used with a single child unit or multiple child units, each having a unique identifier. A plurality of operating channels can be used and methods are explained for selecting an operating channel for a particular parent-child unit pair. These methods generally include a scheme for stepping incrementally through one or more available channels of a particular frequency band, with each of the plurality of channels having a numbered sequence. A plurality of channels can be stepped through in sequential order from a lowest numbered channel of the sequence to a highest numbered channel of the sequence. Or other channel stepping techniques can be used. Stepping through channels can be repeated as needed. Another possible approach includes hopping randomly through the sequence of channels based at least in part on a predetermined algorithm. Such algorithm might be, for example, to selected a channel from the a t low, mid or high portion of a frequency band.

Other aspects, features and advantages of the inventions claimed and/or described herein will become apparent from the following detailed description, the accompanying drawings, and the appended claims.

DETAILED DESCRIPTION

Figure 1:
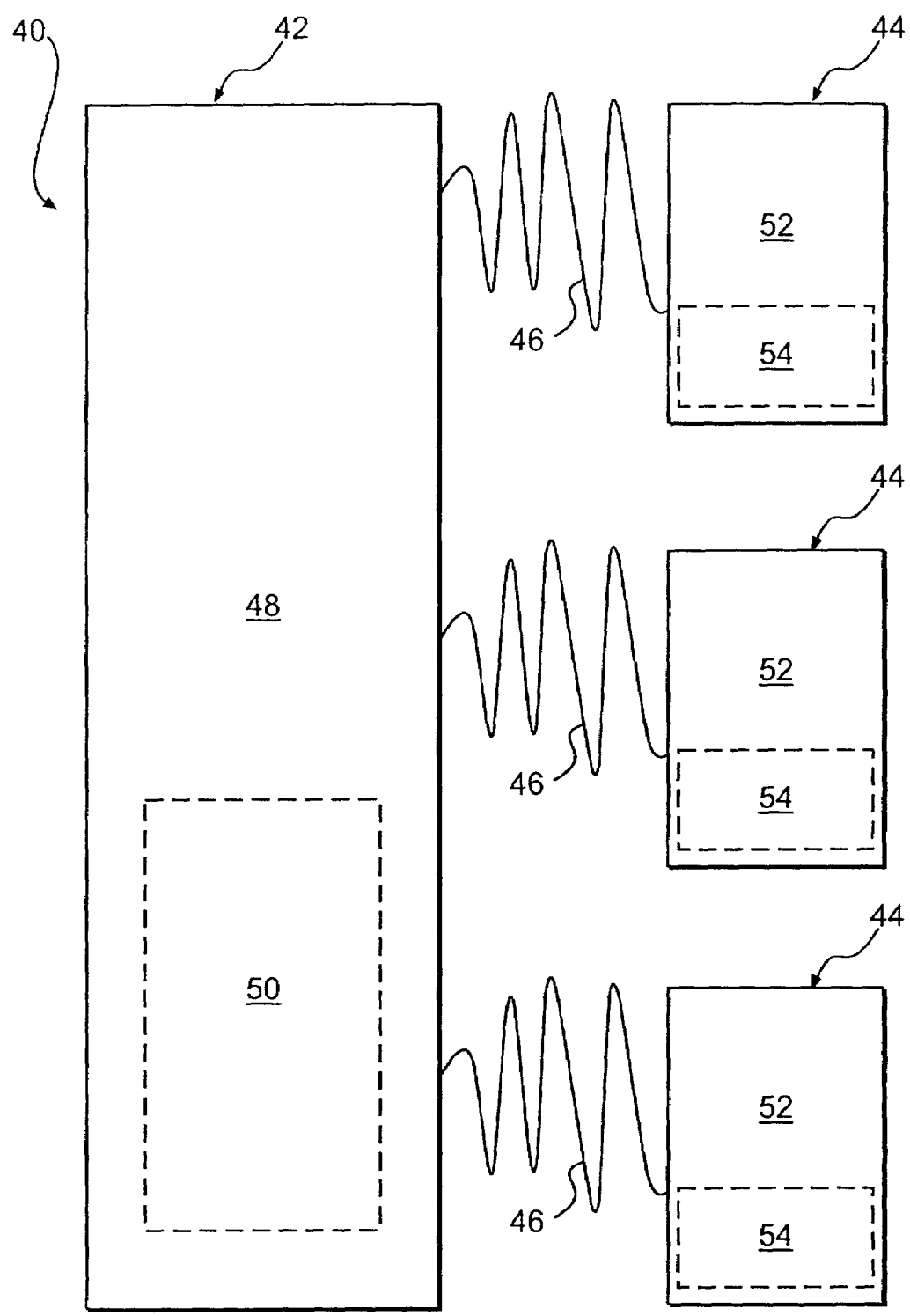
FIG. 1 is a block diagram of a monitoring and locating system 40 according to the inventions.

FIG. 1 is a block diagram showing the schematic arrangement of a monitoring and locating device constructed according to the inventions. The monitoring and locating device, generally indicated by reference numeral 40 includes a master control (hereafter referred to as parent unit), generally indicated by reference numeral 42, and one or more portable remote units (hereafter referred to as child units), generally indicated by reference numeral 44, in communication, e.g., radio frequency (RF), with the parent unit 42. The parent unit 42 acquires each of the plurality of child units 44 by assigning the child units 44 an individual identifier or ID code, generally indicated by 46. The parent unit 42 monitors and tracks each child unit 44 by transmitting and receiving signals including the ID code 46 to and from the child units 44, such that the parent unit 44 may be used to locate a selected child unit from the one or more child units 44. For example, the ID codes 46 may include a modulated RF signal carried by a RF carrier signal.

The parent unit 42 and each child unit 44 may include an enclosure or housing 48, 52, respectively. Each housing 48, 52 may be designed to protect electrical circuitry 50, 54, respectively, and may be configured to allow the parent unit 42 to communicate (i.e., monitor, track and locate) with the child units 44. For example, the housings 48, 52 may be any configuration and either made of plastic or any other material capable of protecting electrical circuitry or electrical components. The housings 48, 52 may have a fastener structure, such as a clip, a fanny pack (i.e., a waistband), or some other fastener means, configured to releasably attach to an object, such as, for example, an adult, a parent, a child, a pet or some other living entity. For example, the clip may attach to a belt or other garment of the person's clothing or the fanny pack may be releasably attached around a person's waist.

The housings 48, 52 may have portions which are configured to receive a keypad, i.e., numeric or alphabetic, key buttons, power buttons or any other user interface structure which may be operatively connected with the respective electrical circuitry 50, 54.

Parent unit 42 and the child units 44 communicate with one another using a variety of predetermined commands or messages, which may be transmitted to and from the parent and child units 42, 44, respectively, using the ID codes 46. For example, normal poll may represent the parent unit 42 transmitting a signal to and receiving a signal from each of the child units 44. Poll acknowledge may represent the child unit 44 transmitting a signal to the parent unit 42. Similarly, poll acknowledge with a low battery may represent the child unit 44 transmitting a signal to the parent unit 42, but having a low battery. It is contemplated that other commands, such as, poll acknowledge with channel change, which may represent the child unit 44 transmitting a signal to the parent unit 42 and requesting to change the operating channel, may be used as well.

Change channel may represent the parent unit 42 communicating to the child units 44 that the operating channel is being changed. ID assignment may represent the parent unit 42 assigning the ID code 46 to each of the child units 44. Search command may represent if the parent unit 42 is searching for or attempting to track one of the child units 44. Search response may represent the child units 44 responding to the search command initiated by the parent unit 42. Panic may represent the help button (i.e., S9) of one of the child units 44 being activated. Power off may represent the parent unit 42 initiating powering off the circuitry 54 via software and the circuitry 50. Request ID and confirm ID acquisition may represent the child units 44 requesting the ID codes 46 from the parent unit 42 and the child units 44 responding to the parent unit 42 that the ID code 46 assigned thereto has been confirmed.

Figure 2:
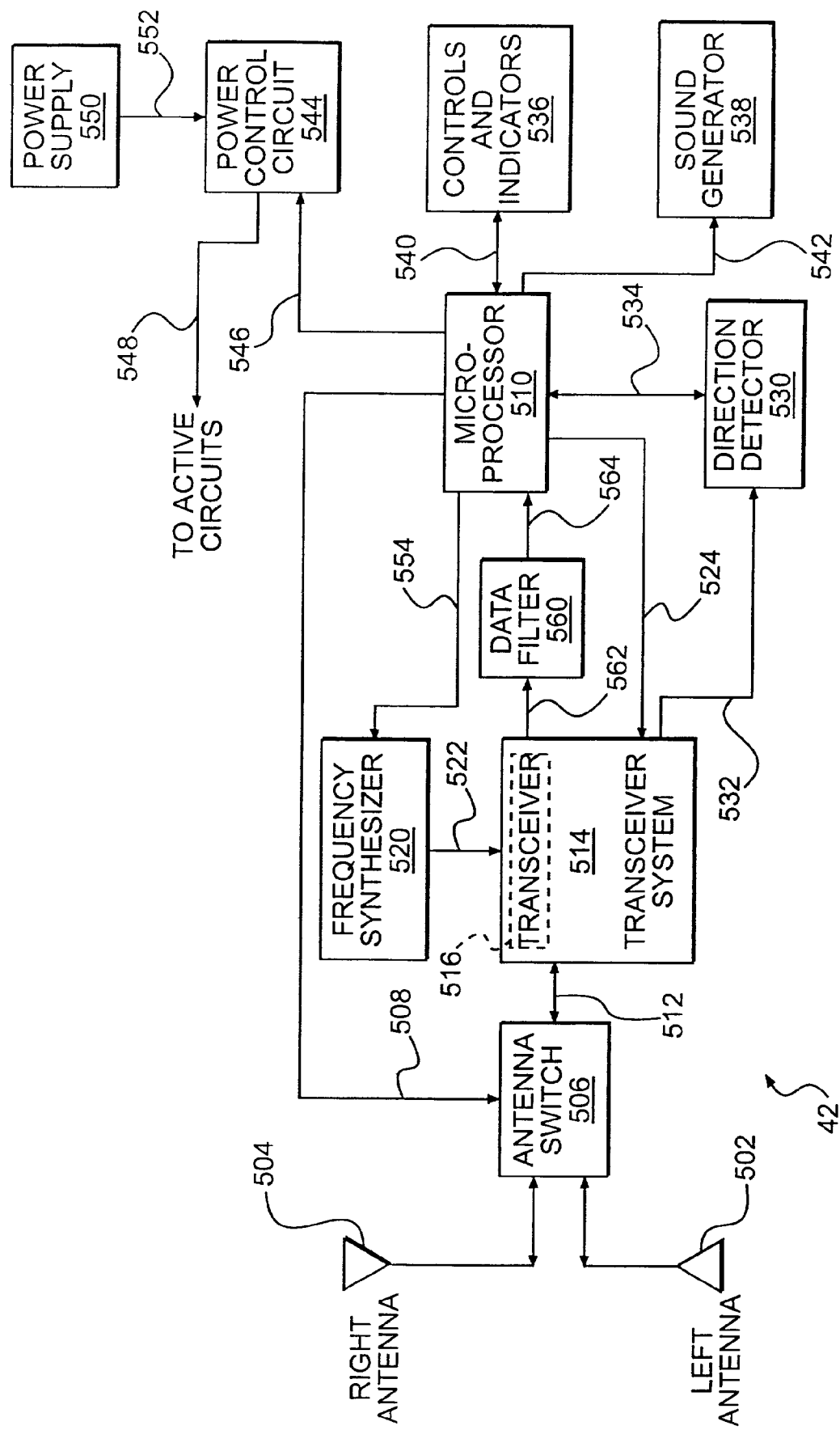
FIG. 2 is a block diagram of the parent unit 42 shown in FIG. 1.

FIG. 2 is a block diagram of the parent unit 42 shown in FIG. 1. Signals from a 'child' unit are received by a pair of antennas 502 and 504. An antenna switch 506 switches based on a control signal 508 from a microprocessor unit 510. The microprocessor unit is advantageously selected to be a PIC 16L73B made by Microchip Technology, Inc. This is the presently preferred selection. Alternatives can be used with the appropriate design changes. Switching is controlled so that antennas 502 and 504 are alternately connected to a signal line 512 of antenna switch 506. Signal line 512 is coupled to a transceiver system 514 including a transceiver 516 so that the transceiver system can transmit signals to and receive signals from antennas 502 and 504 via antenna switch 506. Transceiver 516 is advantageously selected to be an RF2945 made by RF Micro Devices, Inc. This particular device merely represents the presently preferred choice. Alternatives can be used. For example, a transceiver with a built in synthesizer could be used. Such an arrangement would eliminate the need for a separate synthesizer.

A frequency synthesizer 520 provides required signals to transceiver system 514 via a signal line 522. The presently preferred choice for frequency synthesizer is an LMX2316 made by National Semiconductor. Alternatives can be used. Frequency synthesizer 520 is controlled by microprocessor unit 510 via a line 554. Transceiver system 514 and microprocessor unit 510 are connected via a signal line 524 so that the microprocessor unit 510 can control the operation of transceiver system 514. A data filter 560 is interposed between transceiver system 514 and microprocessor unit 510 via lines 562 and 564. Information output from transceiver system 514 is coupled to a direction detector 530 via a signal line 532. Direction detector 530 provides its output information to microprocessor unit 510 via a signal line 534. Microprocessor unit 510 processes information received from direction detector 530 and drives various controls and indicators 536 and a sound generator 538 via respective signal lines 540 and 542 to provide a human interface with the user. Microprocessor unit 510 also controls a power control circuit 544 via a signal line 546. Power control circuit 544 provides power and control to active circuits of the monitoring and locating device via a line 548. A power supply 550 provides power to power control circuit via line 552. As used herein 'line' can refer to multiple line cables, where appropriate.

For the purpose of this description, it is assumed that the child unit is at some distance from the parent unit and that the system has been placed in the "direction finding" mode. Antennas 502 and 504 (see FIG. 2) are mounted within (or on) the parent unit 42. For direction finding purposes, parent unit 42 is held, in the hand of the operator, such that each of antennas 502 and 504 is approximately equal distance from the operator's face. As he holds and maintains parent unit 42 in this position and rotates his body, the physical distance of each of antennas 502 and 504 will change relative to that of the child unit. Direction is determined by measuring the electrical phase angles of respective antenna signals. Antennas 502 and 504 are physically mounted within or on parent unit 42 such that they are spaced apart by not more than one-quarter wavelength, or 90 electrical degrees at frequencies being used. Thus the relative electrical phase angle, measured at the antenna terminals, can never be greater than plus or minus 90 degrees, regardless of antenna orientation. When the antennas are equal distance from the child unit 44, the measured phase angle difference between antennas 502 and 504 will be 0 degrees, because a signal from child unit 44 arrives at both antennas at the same time. As parent unit 42 is physically rotated, one antenna becomes slightly closer to child unit 44 as compared to the other. This will cause a phase difference between the signals from antennas 502 and 504. The antenna that is closer to the child unit 44 will "lead" in phase because the signal arrives at this antenna earlier. Thus, if parent unit 42 rotates 360 degrees, the electrical phase angle difference will change by plus or minus 90 degrees (twice for each rotation).

The signals from antennas 502 and 504 are amplified before useful information is extracted. If two phase coherent receivers (one for each antenna) are connected to the antenna terminals, then the amplified signal from each receiver can be input to a phase detector and the resultant voltage from the detector can be processed to obtain the direction of child unit 44.

However, it is more desirable to use only one receiver from the standpoint of minimizing cost and complexity. In order to use a single receiver, the two antennas must be multiplexed. This is accomplished by the use of antenna switch 506. Antenna switch 506 is essentially a single pole, two positions, RF switch. Switching between antennas is accomplished by applying a control signal to antenna switch 506 via signal line 508. When the control signal is in one state, the left antenna 502 is selected, and when the control signal switches to the opposite state, the right antenna 504 is selected. Thus, signals from antennas 502 and 504 can be alternately coupled to transceiver 516 in a time-multiplexed manner. Because the signals from antennas 502 and 504 are never present simultaneously, phase information from each of the antennas is temporarily stored and the stored phases are compared.

One way to accomplish this is to temporarily store the phase information from one of the antennas 502 and 504 and then immediately compare it with the phase information from the other of the antennas. In this case the phase detector output is a pulse whose amplitude is a function of the phase angle between the signals from antennas 502 and 504 and whose duration is equal to the antenna-switching rate.

An alternative would be to store the information from one of the antennas and then to store the information from the other of the antennas. Then compare the two stored pieces of information. Actual phase comparison is carried out in direction detector 530. In this configuration the phase detector's output has a non-pulsed amplitude that is a function of the phase angle between the signals from antennas 502 and 504. The antenna-switching rate is selected so that it is appropriate for the frequencies used and phase comparisons to be made. If switching (sampling) is carried out at too slow a rate, each antenna spends more time in a given state and there is a higher probability that the information stored will not be valid. This is true because the antenna phase "in a real world situation" is constantly changing. For example, the child is running and the parent is moving, therefore, the antennas are constantly changing phase. It has been determined that the antenna-sampling rate should be in the range of ¼ to ⅙ of the carrier frequency. This becomes impractical if the carrier frequency is high in comparison to the bandwidth of the system. To overcome this problem the carrier is mixed down to a much lower frequency.

"Mixing down" preserves the phase information and at the same time allows a lower sampling rate. The IF frequency of transceiver 516 is advantageously selected to be 10.7 MHz. This is still to high to get a practical sampling rate for the information bandwidth. In this system the 10.7 MHz is mixed again to approximately 300 KHz. This allows the sampling rate to be set to 50 to 75 KHz, which is practical for this system. Other frequencies can be used. The frequency specified is presently considered to be the best mode for carrying out the inventions defined herein.

Processing the sampled phase information to obtain the direction information can be accomplished in a number of ways. The presently preferred way is to use a software algorithm and a DSP (Digital Signal Processor). An alternative would be to use a microprocessor with sufficient processing power. The presently preferred approach is considered to be the most practical at the time this document was prepared. Other approaches may be more practical in the future.

Figure 3:
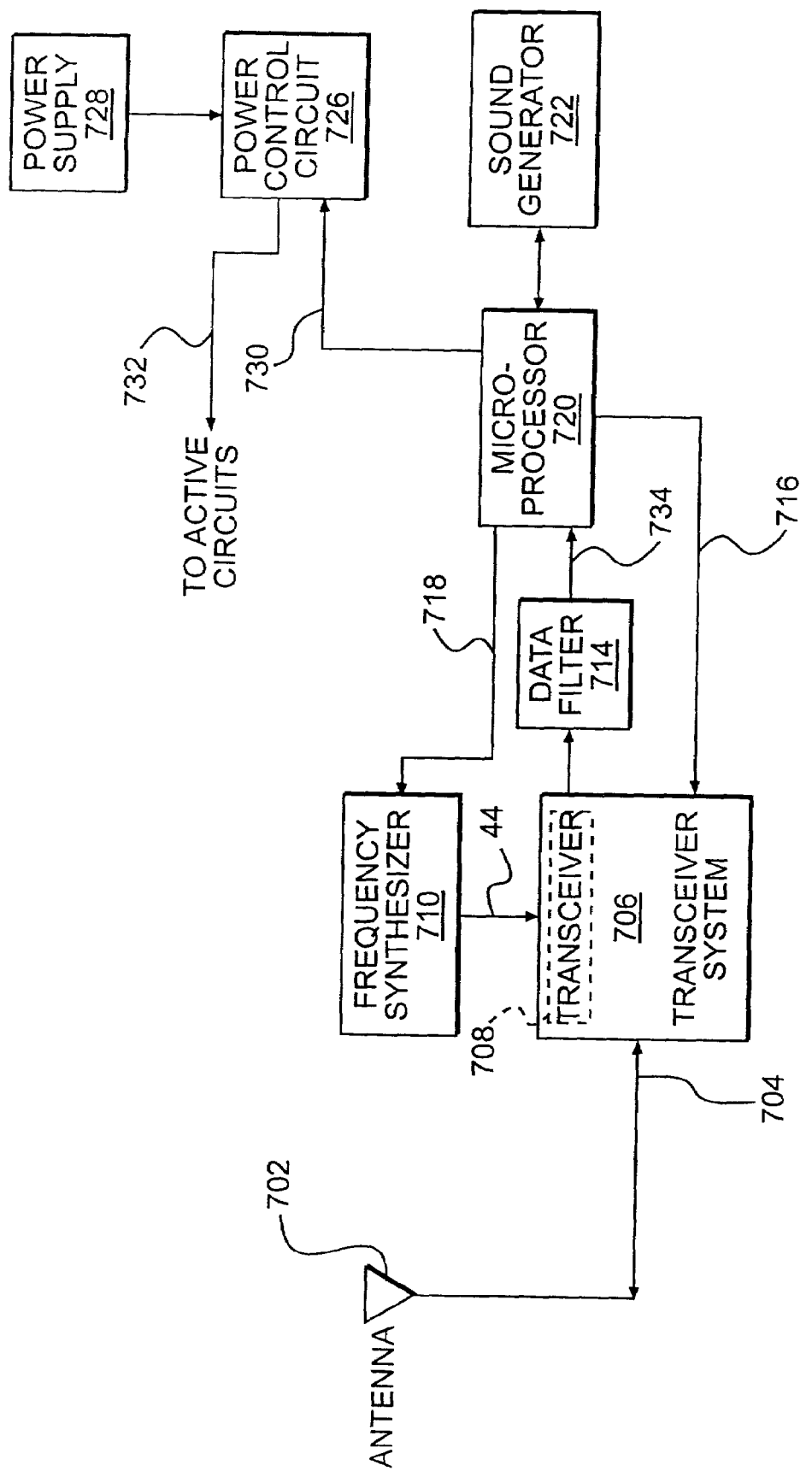
FIG. 3 is a block diagram of a child unit 44 shown in FIG. 1.

FIG. 3 is a block diagram of a child unit 44 shown in FIG. 1. Signals transmitted from the parent unit are received by antenna 702 which feeds the signal line 704, a microstrip transmission line. Signal line 704 is coupled to a transceiver system 706 including a transceiver 708 so that the transceiver system can either transmit signals to, or receive signals from, antenna 702. Transceiver 706 is advantageously selected to be an RF2945 made by RF Micro Devices, Inc. This particular device merely represents the presently preferred choice.

Alternatives can be used with appropriate design changes where necessary. A frequency synthesizer 710 provides required signals to transceiver system 706 via a signal line 712. The presently preferred choice for frequency synthesizer is an LMX2316 made by National Semiconductor. Alternatives can be used, for instance, Transceivers are available with built in Synthesizers, eliminating the need for a separate synthesizer. Frequency synthesizer, 710 is controlled by microprocessor unit 720, via a line 718. Transceiver system 706 and microprocessor unit 720, are connected via a signal line 716 so that the microprocessor unit 720 can control the operation of transceiver system 706.

A data filter 714 is interposed between transceiver system 706 and microprocessor unit 720 via lines 734 and 736. Microprocessor unit 720 processes information received from the parent unit via the transceiver system 706 and in turn, sends this information to the data filter 714 to remove noise from the received data. The microprocessor then performs further processing and transmits back a response to the parent unit. Upon certain commands received from the parent unit, the microprocessor unit drives a sound generator 722 via respective signal lines 738, to provide audible aid in the parent finding the child.

Microprocessor unit 720 also controls a power control circuit 726 via a signal line 730. Power control circuit 726 provides power and control to the active circuits via line 732. A power supply 728 provides power to the power control circuit via line 740. Additionally the power control unit monitors and sends battery charge status to the microprocessor. The microprocessor 720, in turn sends a "low battery" coded message via data via line 716, to the transceiver systems. The transceiver system transmits the warning message, to the parent unit. As used herein 'line' can refer to multiple line cables, where appropriate.

Figure 4:
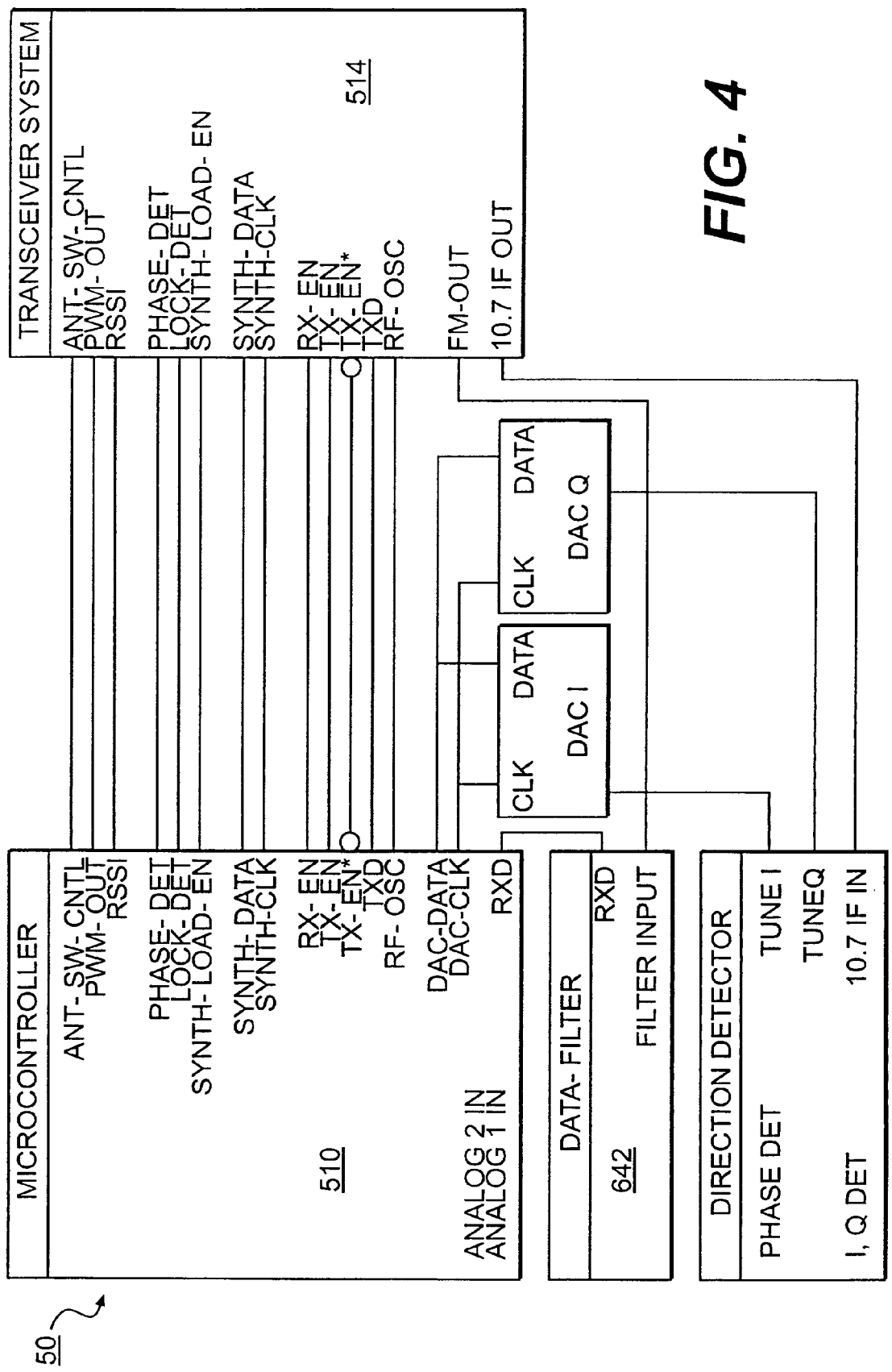
FIG. 4 is an illustration of electrical circuitry implemented in the parent unit according to an exemplary embodiment.

FIG. 4 is a schematic diagram showing some of the electrical circuitry 50 of parent unit 42. Some of the 'blocks' correspond to functional blocks shown in FIG. 2. RF signals are transmitted or received through transceiver system 514. In the receive mode, a signal output from transceiver system 514 is filtered through the data filter 560 then passed on to the microprocessor unit 510, where the data is processed. When in the tracking mode, the direction detector 530 feeds data to microprocessor unit 510. Microprocessor unit 510 processes the data and drives controls and indicators 536 (see FIG. 2).

Figure 5:
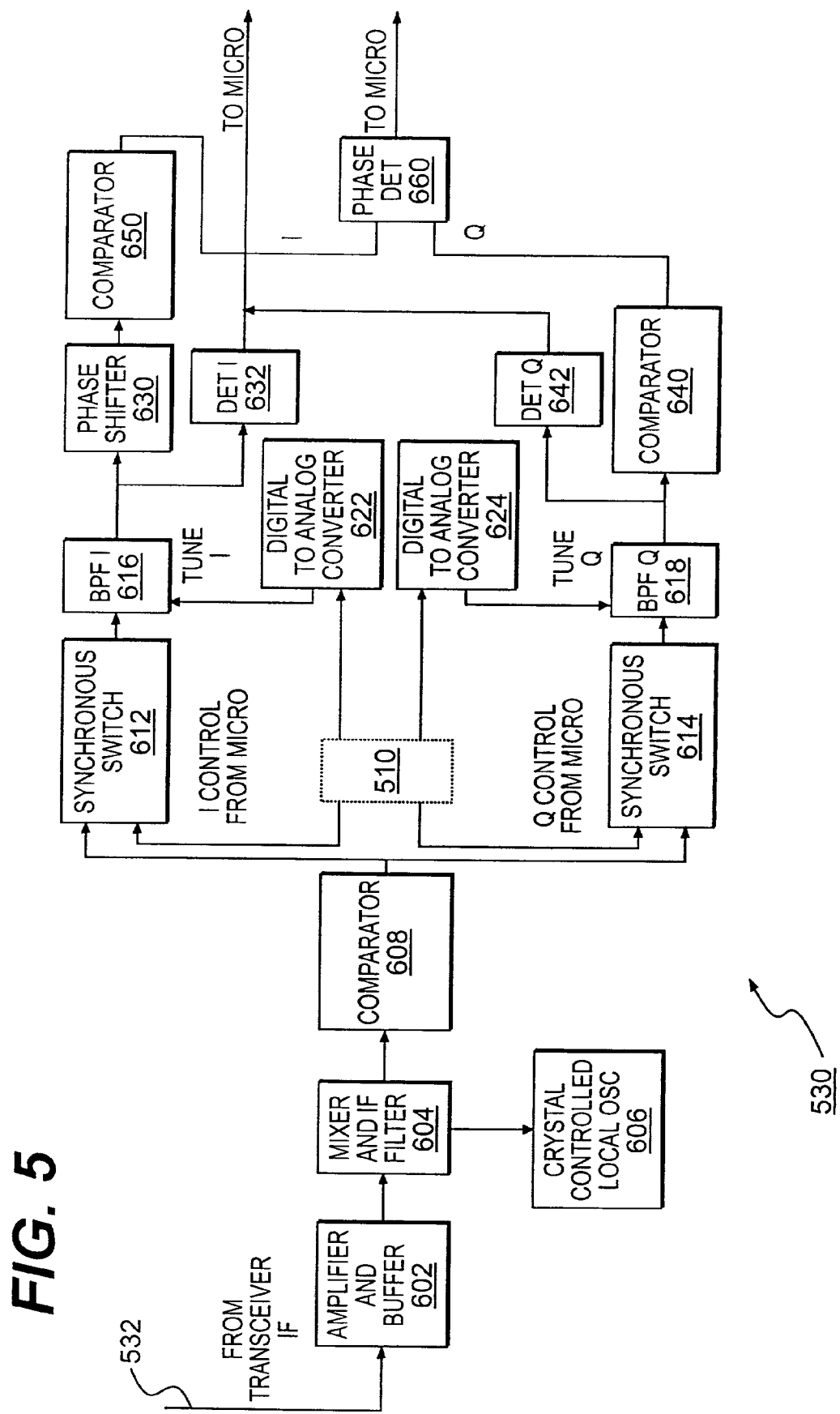
FIG. 5 is a detailed block diagram of the direction detector 530 shown as a single block in FIG. 2.

FIG. 5 is a more detailed block diagram of direction detector 530. Signal line 532 from an IF stage of transceiver 516 is coupled to an input of an amplifier/buffer 602. An output of amplifier/buffer 602 is coupled to an input of a mixer and IF filter 604 which also receives a signal from a crystal controlled local oscillator 606. An output from mixer and IF filter 604 is coupled to an input of a comparator 608.

An output of comparator 608 is coupled to a pair of synchronous switches 612 and 614, controlled by respective I and Q control signals from microprocessor unit 510. Output from synchronous switch 612 is coupled to a band pass filter I 616. Output from synchronous switch 614 is coupled to a band pass filter Q 618. Band pass filters 616 and 618 are respectively tuned by analog signals from respective digital to analog converters 622 and 624 which are controlled by microprocessor unit 510.

Output of band pass filter 616 is coupled to a phase shifter 630 and detector 632. Output of band pass filter 618 is coupled to a comparator 640 and a detector 642. Outputs of detectors 632 and 642 are coupled to microprocessor unit 510. Output of phase shifter 630 is coupled to comparator 650 Output from comparator 650 is coupled to an "I" input of a phase detector 660. Output from comparator 640 is coupled to a "Q" input of phase detector 660. Output of phase detector 660 is coupled to microprocessor unit 510.

Amplifier and buffer 602 buffers the signal obtained from the IF of transceiver 516. The buffer portion of amplifier and buffer 602 minimizes the loading effect on transceiver 516. The output of amplifier and buffer 602 is coupled to mixer and IF filter 604, which mixes the 10.7 MHz IF signal with an 11 MHz. signal from Crystal Controlled Local Oscillator 606. The resultant IF signal includes sum and difference components of the two signals. The difference signal (300 KHz) is filtered at the output of mixer and IF filter 604 and coupled to an input of voltage comparator 608.

Comparator 608 provides a well defined 300 KHz. square wave output. The square wave signal from comparator 608 is coupled to two synchronous switches 612 and 614. Switches 612 and 614 can be implemented by the use of logic gates that operate as synchronous switches. The switches, operating in sync with the antenna switch 506 (FIG. 2), separate a serial signal from comparator 608 into left and right antenna signals (called "I" and "Q"). These signals appear as "bursts". Each burst has a duration equivalent to the time that the antenna is connected to the receiver input. If, for example, the sampling rate is 50 KHz., one will observe repeated 3 cycle bursts at the output of each gate. It is not necessary that the sampling be harmonically coherent with the IF signal. It simply means that the bursts will not be exactly 3 cycles. The "I" signal is fed into a narrow band bandpass filter 616. The "Q" signal is fed into narrow band bandpass filter 618. Filters 616 and 618 provide the storage of phase information obtained from the two antennas. This occurs in the following manner: The burst signal excites the narrow bandpass filter. When the burst ends the bandpass filter continues to "ring" at the burst frequency. The result is a continuous signal at the output of each filter that contains the phase information of the signals that were received at the antennas.

Since the bandpass filters are narrow band, it is important that they maintain resonance at the center of the 300 KHz. frequency. The IF frequency may not actually be 300 KHz. because of drift in the local oscillators of the system. To assure that that the filters are tuned at the exact IF center frequency, filters 616 and 618 are implemented as electronically tunable filters and microprocessor unit 510 is programmed to periodically retune these electronically tunable filters. In order to tune filters 616 and 618, the signal amplitude of each filter's output is "peaked." To accomplish this peaking amplitude detectors 632 and 642 are provided at the respective outputs of filters 616 and 618. Respective outputs of detectors 632 and 642 are input to analog input ports of microprocessor unit 510. Microprocessor unit 510 outputs a digital signal to digital-to-analog converters 622 and 624. Converters 622 and 624 output a tuning voltage to each filter.

As an alternative, it is possible to arrange for this function to be carried out another way. It is possible to eliminate the detectors and sample the signal out of the filter if the microprocessor is capable of processing these signals directly.

Because of the narrow band characteristics of bandpass filters 616 and 618, the harmonic components that make up the square wave have been removed, therefore, a sine wave appears at their output. Phase detector 660 requires a square wave input. Therefore, the sine-wave signals need to be converted back to square waves. This is accomplished by feeding each sine-wave signals into its respective comparator 650 and 640. The outputs of comparators 650 and 640 are input to the phase detector 660.

Phase detector 660 requires that the input signal, range in phase from 0 to 180 degrees. It provides a corresponding output voltage of 0 to approximately plus 3 volts. However, the antennas provide a phase shift of 0 degrees to plus or minus 90 degrees. To resolve this incapability, the phase of one of the two signals that are input to the detector is shifted by 90 degrees. A 90-degree phase shift circuit 630 is inserted between filter 616 and its corresponding comparator 650. When parent unit 42 is pointed directly toward child unit 44, phase detector 660 outputs a voltage of approximately 1.5-volts. When child unit 44 is to the left of center, the detector will output a voltage of less than 1.5-volts and when the child unit is to the right of center, the detector will output a voltage of greater than 1.5-volts. Therefore, the magnitude of the output voltage is a function of the phase shift at the antennas.

The output of phase detector 660 is input to an analog port of the microprocessor unit 510, where it is processed prior to driving the direction indicators (see software flow diagram).

Microprocessor unit 510 may be any logical processor configured to process logical instructions. In the illustrated embodiment, the microprocessor unit 510 is programmed to generate the ID codes 46 for each child unit 44 and may be configured to store the ID codes 46 therein.

The microprocessor unit 510 has a number of different operating modes, some of which may include sleep mode, track mode, poll receive mode, track receive mode, track mode, or direction detect mode.

A power supply 550 may supply power to the microprocessor unit 510. In the illustrated embodiment, the power supply 550 is a DC voltage provided by batteries that are rechargeable or disposable. Alternatively, 120 volt or 240 volt AC to DC power adapter may be supplied to the unit. The parent unit 42 may be adapted to include circuitry for recharging the power supply 550. The parent unit 42 may also include a battery strength indicator.

Figure 6:
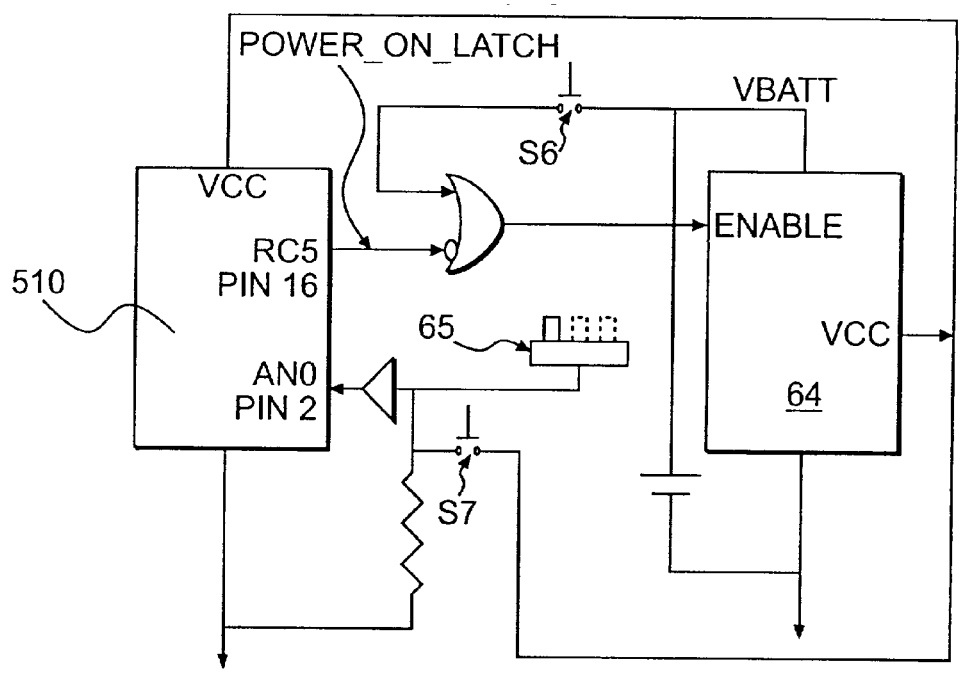
FIG. 6 is illustrates the logical structure of the power control circuitry of the parent unit.

FIG. 6 is a schematic diagram explaining power control in parent unit 42 (see functional block 544 in FIG. 2). A range select switch 65 is coupled with a range select circuit so that the range select switch can control a range select switch state. This state is multiplexed onto the same pin as is the power button state, thus they are considered together. The range select switch 65 is implemented so that a user can select a number of different operating ranges for communication between the parent unit 42 and the child units 44.

A "power button" is constituted by two normally open switches, S6 and S7 ganged together. When the power button (S6 and S7) is pressed, switches S6 and S7 are closed. When switch S6 is closed Vbatt is connected to the enable pin of a voltage regulator, 64 and a source voltage VCC of 3.0 volts is provided to the microprocessor unit 510. The voltage regulator unit is advantageously selected to be a Micrel Semiconductor Inc., part number MIC5205-3.0. This is the presently preferred selection. Alternatives can be used with the appropriate design changes. In order for the power supply (see 550 in FIG. 2) to continue to provide power, a power on latch PWR_ON_LATCH* (i.e., port RC5 of a microprocessor unit 510) must be set low before the user has the opportunity to cease pressing the power button (S6 or S7).

Essentially VCC is applied in response to the user pressing the power button (S6 and S7). This, causes microprocessor unit 510 to turn on. In child unit 44, when the child unit's power button (S8 or S9) is depressed, microprocessor 720 (see FIG. 3) asserts the power on latch PWR_ON_LATCH* (i.e., port RC5), which randomly assigns the ID code 46 to child unit 44. Each ID code 46 is a 8-bit number generated by microprocessor 510 that includes 6 bits randomly assigned by microprocessor unit 510 during power up and 2 bits representing a number of one of the child units 44 is then appended to the 6 bit randomly assigned number. In general, multiple 8-bit numbers may be used to accommodate additional child units 44. For example, the number of 8-bit numbers implemented within each monitoring and locating device 40 depends upon the number of child units 44 associated and in communication with and the parent unit 42.

To turn the parent unit 42 off in the illustrated embodiment, the power button (S6 and S7) is pressed and held for a predetermined minimum amount of time, for example, 1 second. As a result, microprocessor 510 can read VCC on port AN0. This voltage indicates the parent unit 42 is to be powered off with the power on latch PWR_ON_LATCH* (i.e., port RC5) being set high and the voltage regulator 64 is shut down or disabled.

The range select function is shared with the power control circuitry on port AN0. When the power switch (S6 and S7) is not depressed, the state of the range select switch is presented to the port AN0 as one of three analog voltages. These analog voltages may be interpreted using an analog to digital converter (A/D converter).

Examples of range switch parameters for a high switch state in the illustrated embodiment may include a voltage of 0.94 volts with a minimum A/D value of 74 and a maximum A/D value of 86. For a middle switch state, an exemplary range of switch parameters may include a voltage of 1.5 volts with a minimum A/D value of 122 and a maximum A/D value of 134. Exemplary range switch parameters for a low switch state may include a voltage of 2.0 volts with a minimum A/D value of 165 and a maximum A/D value of 177. With the power button S6 or S7 depressed, the exemplary range of switch parameters may include a voltage of 2.7 volts to 3.3 volts with a minimum A/D value of 240 and a maximum A/D value of 255.

Essentially the user presses the power button (S6 or S7) for at least the predetermined minimum amount of time to indicate a switch off. Microprocessor unite 510 waits for the power button (S6 and S7) to be released then deasserts or releases the power on latch PWR_ON_LATCH* (i.e., port RC5), which allows the energy source VCC to be turned off.

Figure 7:
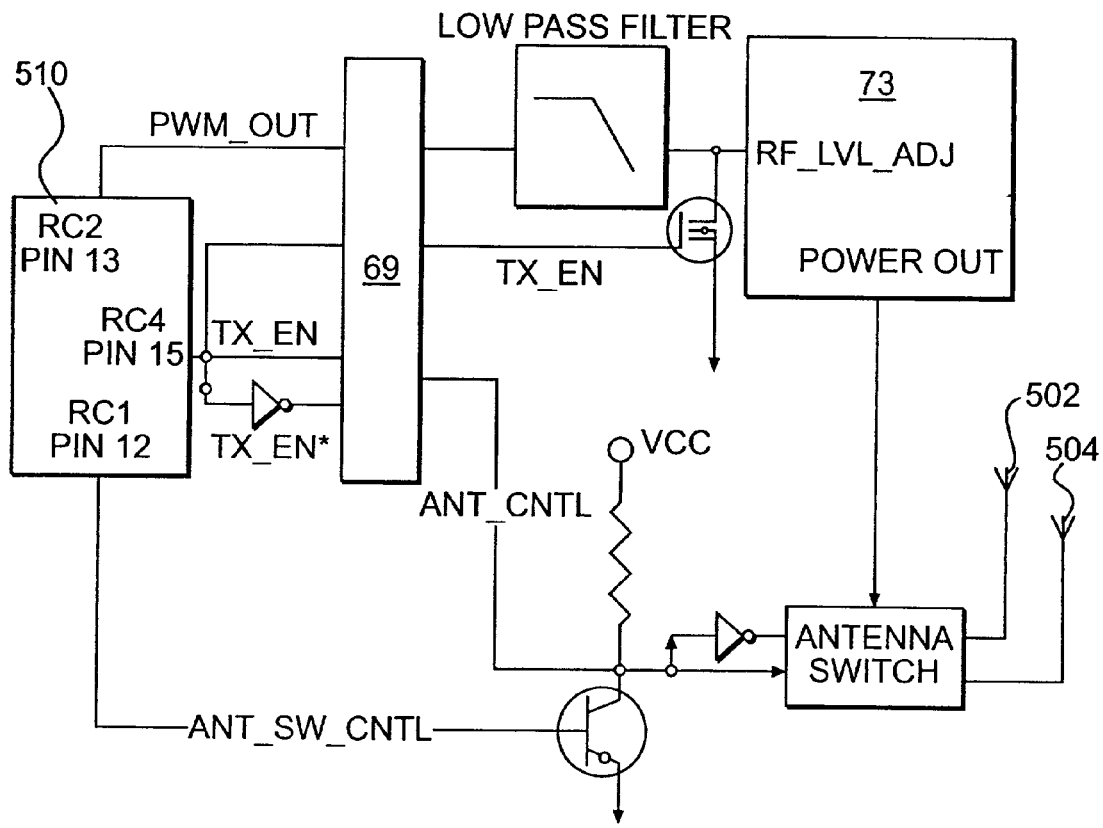
FIG. 7 is illustrates the logical structure of the range selection circuitry of parent unit 42.

FIG. 7 is a schematic diagram explaining the logical structure of the range selection function of parent unit 42. Transceiver system 514 (see FIG. 2) is coupled to microprocessor 510. Transceiver system 514 (see FIG. 2) transmits and receives its signals via separate antennae 502 and 504 configured to transmit and receive modulated RF signals to and from the child units 44. The antennae 502 and 504 may alternately transmit command signals and the ID codes 46 to each of the child units 44 and can also receive signals from the child units 44.

The antennae 502 and 504 may either transmit or receive, but the antennas do not perform both simultaneously. Another antenna switch, within the transceiver system, operates in a half duplex mode, thus allowing the antennas 502 and 504 to perform the function of transmission or reception. At the same time it prevents the transmission output power from damaging the transceiver, receiver input. Transmission and reception can occur on the same frequency, but it is not necessary that they do so.

In the illustrated embodiment, a data filter, implemented as a low-pass filter 58 is provided to deliver an energy signal, such as a 3.0-volt Complementary Metal Oxide Semiconductor (CMOS) signal, to microprocessor unit 510. As illustrated, the data filter, implemented as low-pass filter 58 is auto-referenced with unity DC gain and optimized for a 10K symbol per second received signal. The low-pass filter 58 may be operatively connected with, e.g., followed by, a data-slicer, however, any configuration is possible.

In the RF section (part of transceiver system 706) of the parent unit 42, RF level control is provided by a pulse width modulator (PWM). The PWM signal (i.e., PWM_OUT) is transmitted from pin RC2, pin 13 of microprocessor unit 510 and is intended to drive two mutually exclusive circuits. When microprocessor unit 510 is operating in the transmit mode, the PWM signal (i.e., PWM_OUT) provides the output voltage for adjusting the RF level of the RF. When microprocessor unit 510 is in tracking mode, the PWM signal (i.e., PWM_OUT) is used to control the switching between the antennae 502, 504.

In the illustrated embodiment, the PWM signal (i.e., PWM_OUT) is multiplexed using a high speed switch 69, which is controlled by the TX_EN signal. For example, when the TX_EN signal is true (a logic one or a high voltage), the PWM signal (i.e., PWM_OUT) may be routed to transceiver 708 which may be implemented as a transceiver or RF chip, such as RF2945, via a low pass filter. For example, the PMW_OUT signal is a digital signal that is pulse width modulated. In the transmit mode, the duty cycle is used to generate an analog value to provide proper RF power. In direction finding mode, the signal is used for switching antenna at approximately 50 KHz. rate, as will be described below.

In the illustrated embodiment, when the TX_EN signal is high, the PWM is used to provide the transmit level power adjust output. It may be preferable that the PWM output port pin be programmed to a high impedance state during the poll receive mode of microprocessor unit 510.

The transmit power level is determined by the analog signal received by transceiver 708 at its LVL_ADJ input. The LVL_ADJ input accepts an analog signal from a predetermined range of energy values, such as 0.0 volts to 3.0 volts. For example, analog signals below 0.7 volts cause the transmit power to be set to a minimum energy value, i.e., 0.0 volts, while maximum transmit power may be achieved, for example, an energy value equaling, for example, 3.0 volts DC. The analog signal to drive LVL_ADJ may be generated by filtering the PWM signal (i.e., PWM_OUT) with low-pass filter 58. In the illustrated embodiment, the parent unit 42 transmits at the power specified by a range switch, such as range switch 65, except for mode change commands. Alternatively, in the child units 44, the transmit power level may be set at the highest attainable level at all times.

In the illustrated embodiment, when the TX_EN signal is false (a logic zero or a low voltage), TX_EN* goes high and then the PWM signal (i.e., PWM_OUT) is routed to the RF_LVL_ADJ in transmit mode. Alternatively, when the TX_EN signal is low, the PWM signal may be gated on the ANT_CNTL signal in order to control the switching between the antennae 502, 504 in direction finding mode.

The antennae 502, 504 may be alternated between receive polls, wherein one poll constitutes transmitting a signal to and receiving a signal from each of the child units 44. In normal mode of microprocessor unit 510, the antenna switching is controlled by an antenna control switch having an ANT_SW_CNTL signal that is transmitted from port RC1, pin 12, of microprocessor unit 510 and is received by port YD, pin 10 of the high speed switch 69.

Although antennae 502, 504 may be alternated at any rate between 50 KHz and 75 KHz it may be preferable to set the input antenna switch rate at approximately 50 kHz when microprocessor unit 510 is in tracking mode.

Figure 8:
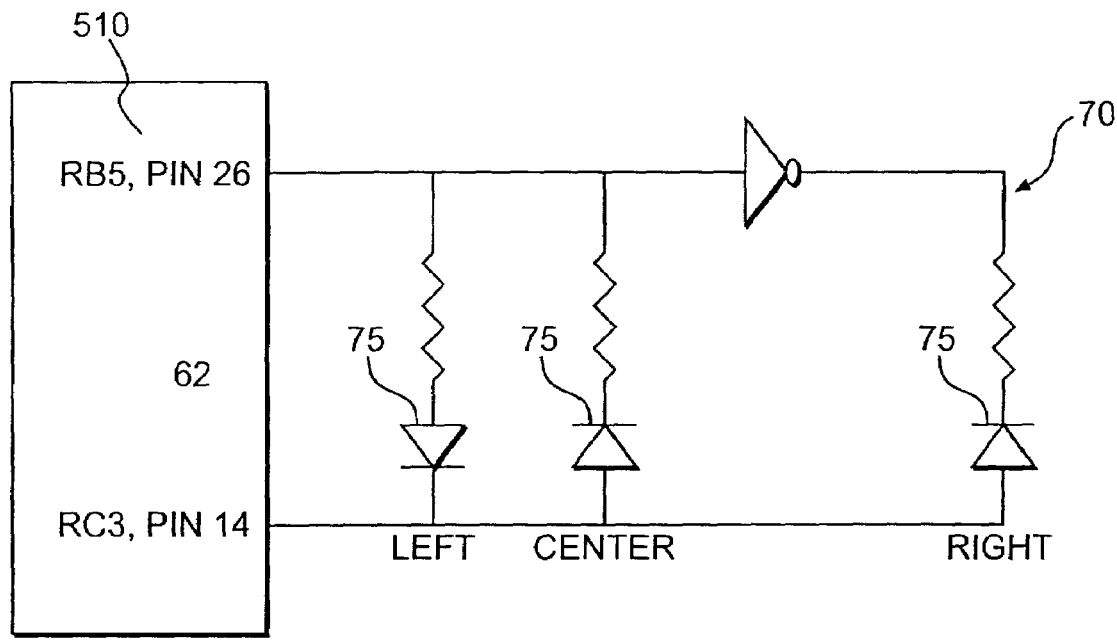
FIG. 8 explains how direction is displayed.

FIG. 8 explains how direction is displayed. Direction display is part of the "controls and indicators" 536 shown in FIG. 2. It is coupled to microprocessor unit 510 so that it can be driven to display the relative position of a selected child unit 44 relative to the parent unit 42 in response to information provided by direction detector 530. This occurs when the parent unit 42 is in the direction finding mode. In the illustrated embodiment, commands and responses from the child unit 44 to enter the direction finding mode are sent using the ID codes 46.

The direction display 70 includes a number of direction LEDs 75, for example a left LED, a right LED and a center LED. Of the three direction LEDs 75, one or none may be commanded to light at any single time or at any frequency by microprocessor unit 510. The operation of the direction display 70 is controlled by the states of the RC3 and RB5 ports of microprocessor unit 510. For example, if the RC3 port and the RB5 port are both 0, then the direction LEDs are turned off. If the RC3 port is 0 and the RB5 port is 1, then the left LED is turned on or lit. If the RC3 port is 1 and the RB5 port is 0, then the center LED is turned on or lit and if the RC3 port and the RB5 port are both 1, then the right LED is turned on or illuminated.

In this exemplary embodiment, frequency synthesizer device 520 (see FIG. 2) is coupled to microprocessor unit 510 and to the transceiver system 514, which includes a transceiver or RF chip, such as RF2945, as described above. The frequency synthesizer device 520 constitutes the operating channel selection circuit of the monitoring and locating device 40. The frequency synthesizer device 520 selects an operating channel on a frequency band for the parent unit 42 to transmit signals to and receive signals from the child unit 44 on the selected operating channel. The selected operating channel may be used for transmission or reception and may be set by appropriately programming the frequency synthesizer device 520, such as, for example, by clocking an array of signals in a control pattern when programming the frequency synthesizer device 520. It is preferable to program the frequency synthesizer device 520 while the transceiver system 514 is in VC0 mode to prevent RF noise, however, the transceiver system 514 can be in any mode thereof, such as a track mode thereof or a sleep mode thereof.

As shown in FIG. 7, a range selection circuit that may include the range selection switches 65. The microprocessor unit 510 may control a sound generator 538 (see FIG. 2), which may be used as an indicator for alarms or warnings, such as low battery detection, as will be described below. Sound generator 538 includes one or more speakers for providing audible information such as warnings to the user.

The speaker may be rendered inoperative when the RF signal is above a minimum strength, i.e., is received by the parent unit 42, but activated when the RF signal falls below the minimum strength, i.e., is not received by the parent unit 42. The minimum strength to correspond to a certain predetermined distance between the parent unit and the selected child unit, whereby the user might select between different predetermined distances via range selection switches on the parent unit to limit the communication range of the parent unit and the child units.

The signal strength of the RF signal transmitted between the parent unit 42 and the child unit 44 may diminish as the distance increases therebetween. As a result, the monitoring, tracking and locating of a child unit 44 may be limited to predetermined ranges, such as, for example, 50, 100, 200 or 1000 feet, by selection of the range selection switch 65. For example, the range select switch 65 may include a slide switch moveable between a low operational range, i.e., 50 feet, a middle operational range, i.e., 100 feet, and a high operational range, i.e., 200 or 1000 feet.

Figure 9:
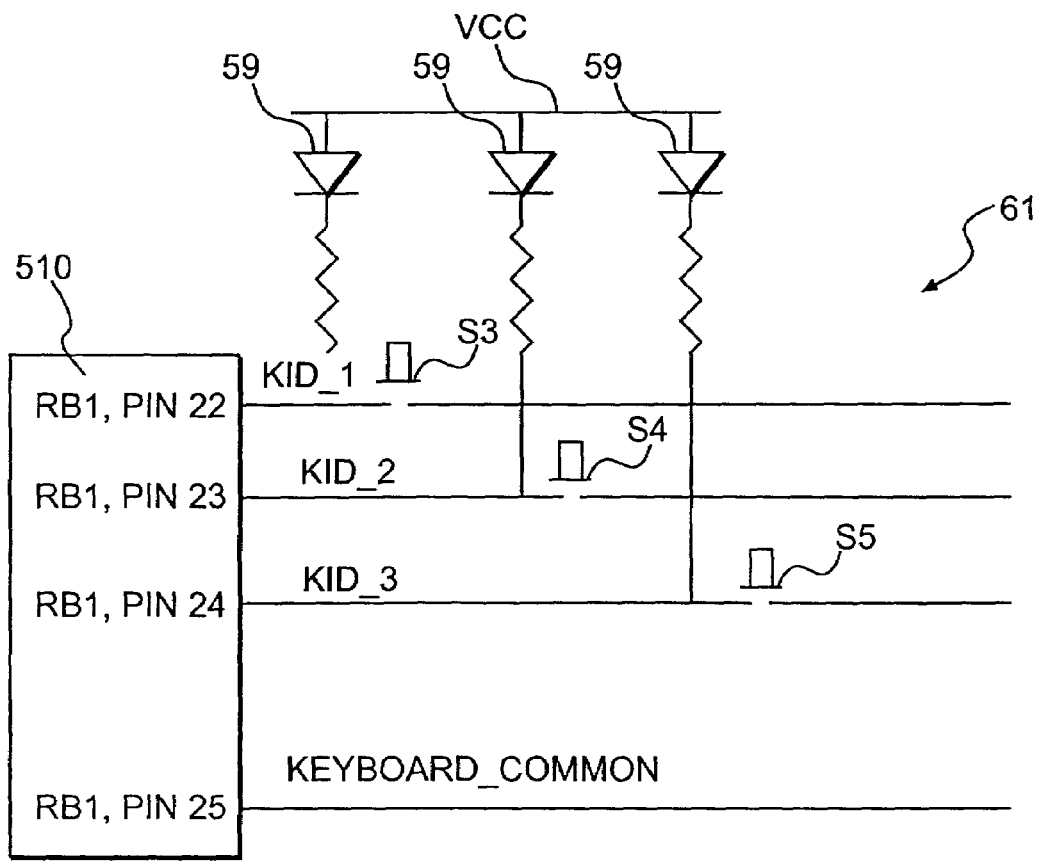
FIG. 9 is an illustration showing the logical structure of the keybutton circuit according to an exemplary embodiment.

FIG. 9 shows a keybutton LED circuit 61, having a number of keybutton LEDs 59. Keybutton circuit 61 is part of the "controls and indicators" shown as general functional block 536 in FIG. 2. The keybutton LED circuit 61 is implemented in the parent unit 42 only, such as, for example, to be visible exteriorly of the housing 48. Each keybutton LED 59 corresponds to an associated child switch S3, S4, S5, respectively. The number of keybutton LEDs 59 and associated switches S3, S4, S5 may directly correspond to the number of child units 44, for example, as one way to monitor each of the child units 44 that are in communication with the parent unit 42.

In the exemplary embodiment, child switch S3 corresponds to a first child unit 44, child switch S4 corresponds to a second child unit 44 and child switch S5 corresponds to a third child unit 44. The keybutton LEDs 59 are controlled through microprocessor unit 720, as shown in FIG. 11, and the child switches S3, S4, S5 may be manually engaged by a user to light the LED 59 associated therewith.

Figure 10:
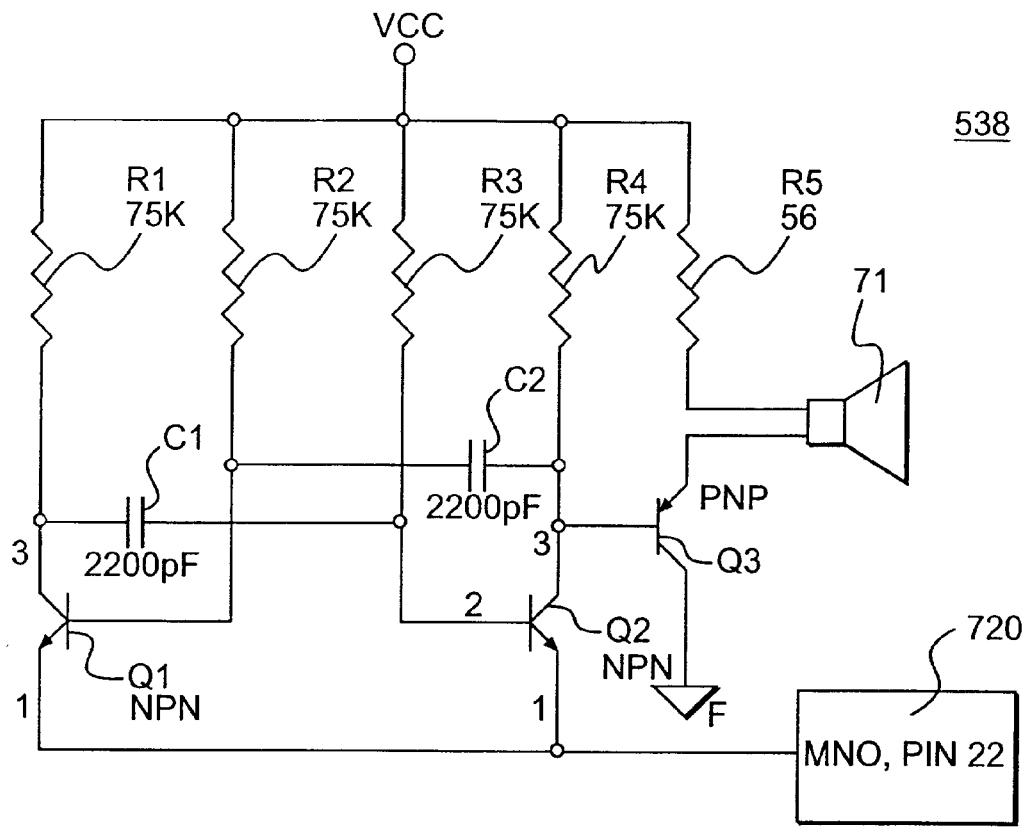
FIG. 10 is a schematic diagram showing an exemplary embodiment of sound generator 538 of parent unit 42 shown in FIG. 2.

FIG. 10 is a schematic diagram showing an exemplary embodiment of sound generator 538 of parent unit 42 shown in FIG. 2. Speaker 71 provides audible information including warnings to the user. The signal from the microprocessor unit 510, when driven low, provides the ground path for the oscillator to begin operation, which drives the speaker 71. It may be preferable for the oscillator to be tuned to the loudest frequency for the speaker 71 and resistor R5 may be provided to limit the total current flow through the speaker 71 to an acceptable level. As illustrated, the parent unit 42 has a single output used to enable or disable the alarm sound from the speaker 71. The microprocessor unit 720 is used to control the speaker sound, i.e., Port RB0, pin 21. In the exemplary embodiment, a low on this port will cause a sound to be emitted from the speaker 71 while a high on this port will mute or turn the speaker 71 off.

Figure 11:
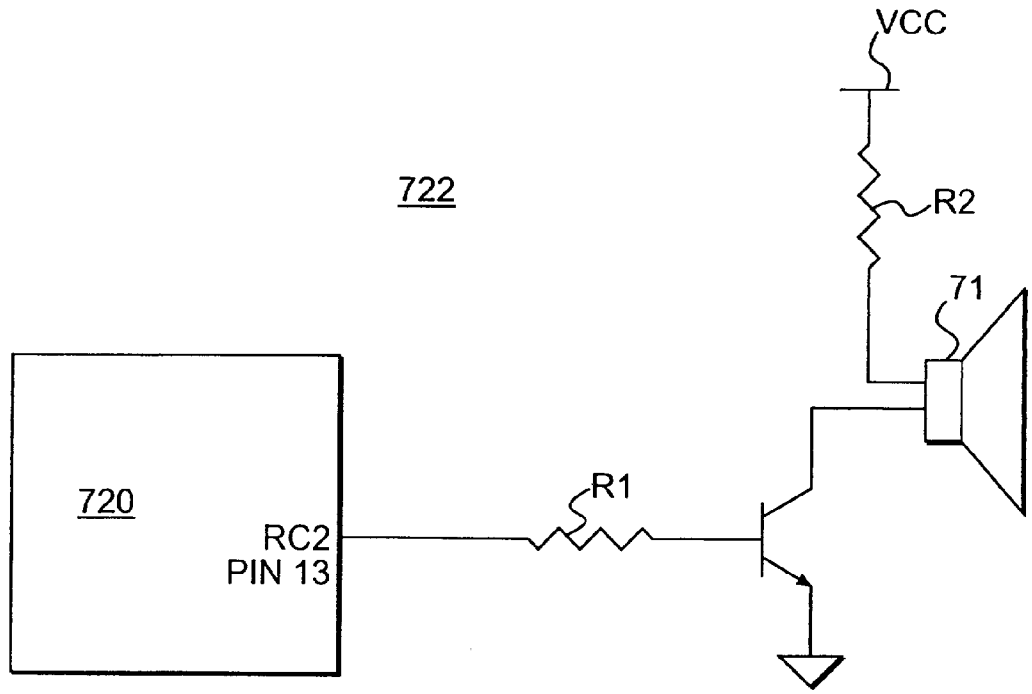
FIG. 11 is a schematic diagram showing an exemplary embodiment of sound generator 722 of child unit 44 shown in FIG. 3.

FIG. 11 is a schematic diagram showing an exemplary embodiment of sound generator 722 of child unit 42 shown in FIG. 3. The sound generator 722 (including speaker 71) of a child unit 44, as illustrated in FIG. 11, is configured slightly differently from the sound generator 538 (see FIG. 2) of the parent unit 42. Speaker 71 in sound generator 722 of child unit 44 is driven directly by microprocessor unit 720, i.e., PWM output, port RC2, pin 13. The coil of speaker 71 may be energized and power may be consumed while port RC2, pin 13 is driven high, therefore, it may be preferable for the port RC2, pin 13 of the microprocessor unit 720 might be driven low while the speaker 71 is not active. For an audio sound to be generated, the output of port RC2, pin 13 needs to be driven at the desired frequency, using the microprocessor unit 720, which may be, for example, a frequency of 3.15 kHz. In the illustrated embodiment, the volume of the speaker 71 may be adjustable in the child units 44. However, it is contemplated that the speakers 71 in both the parent unit 42 and the child units 44 may have adjustable volume and frequency.

Figure 12:
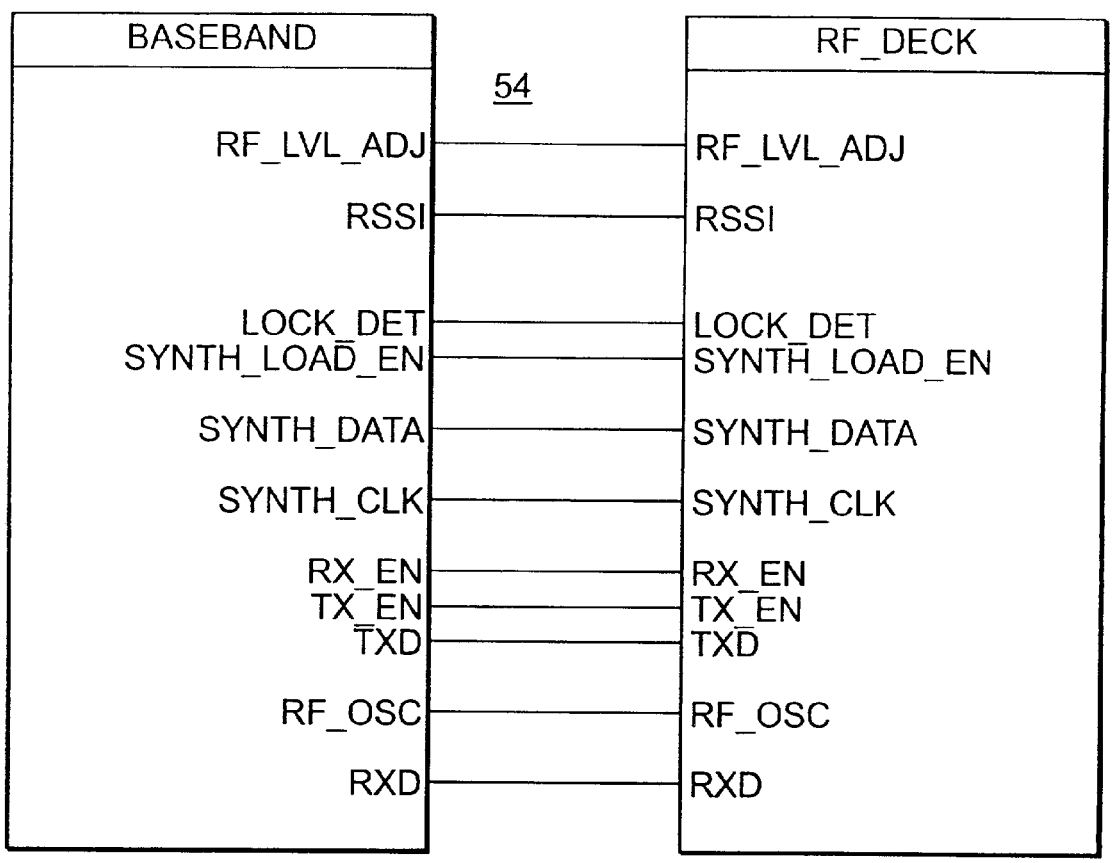
FIG. 12 is a schematic diagram of an exemplary embodiment of circuitry 54 of a child unit 44.
Figure 13:
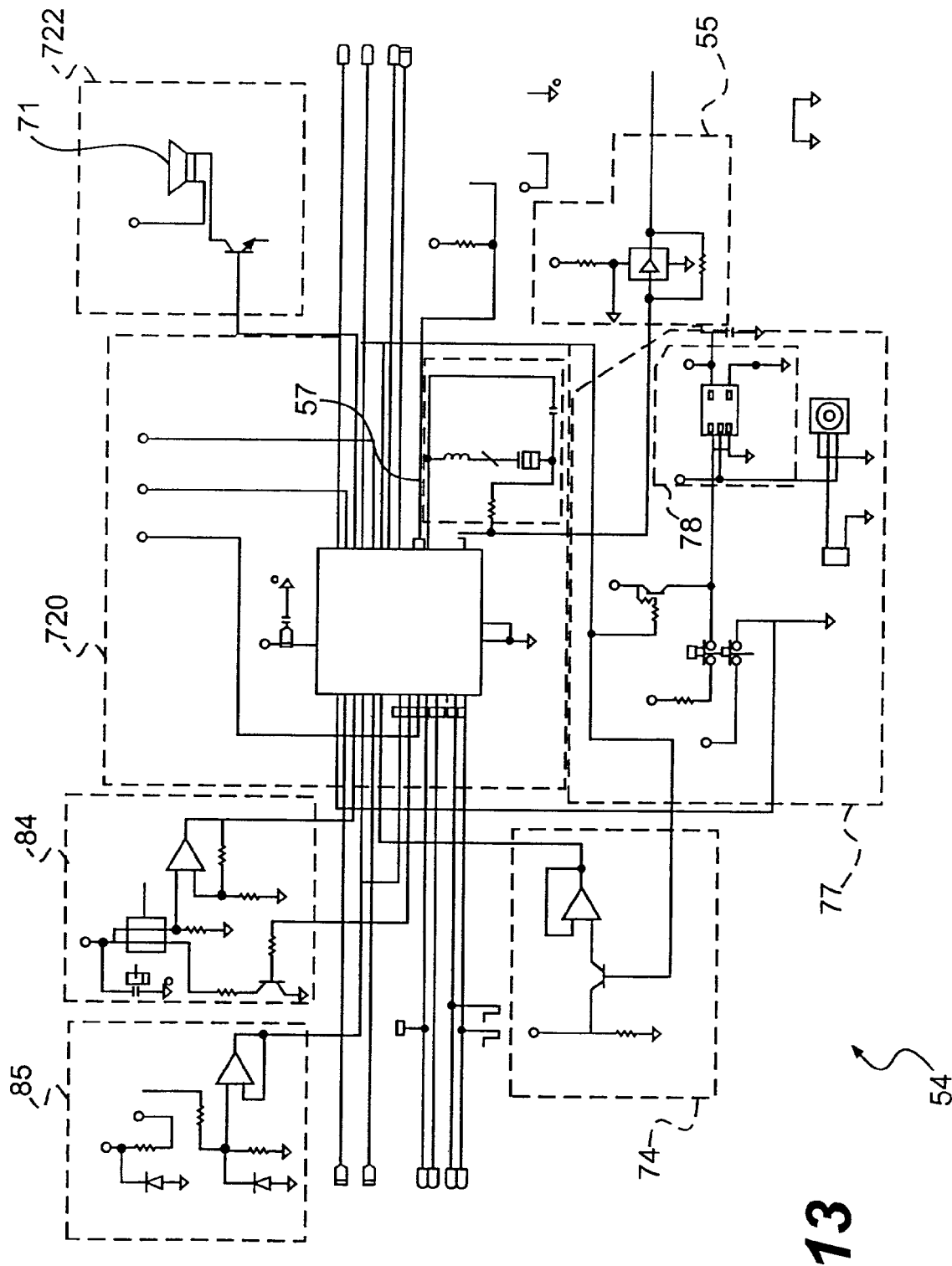
FIG. 13 is a schematic diagram of the control section of a child unit 44.
Figure 14:
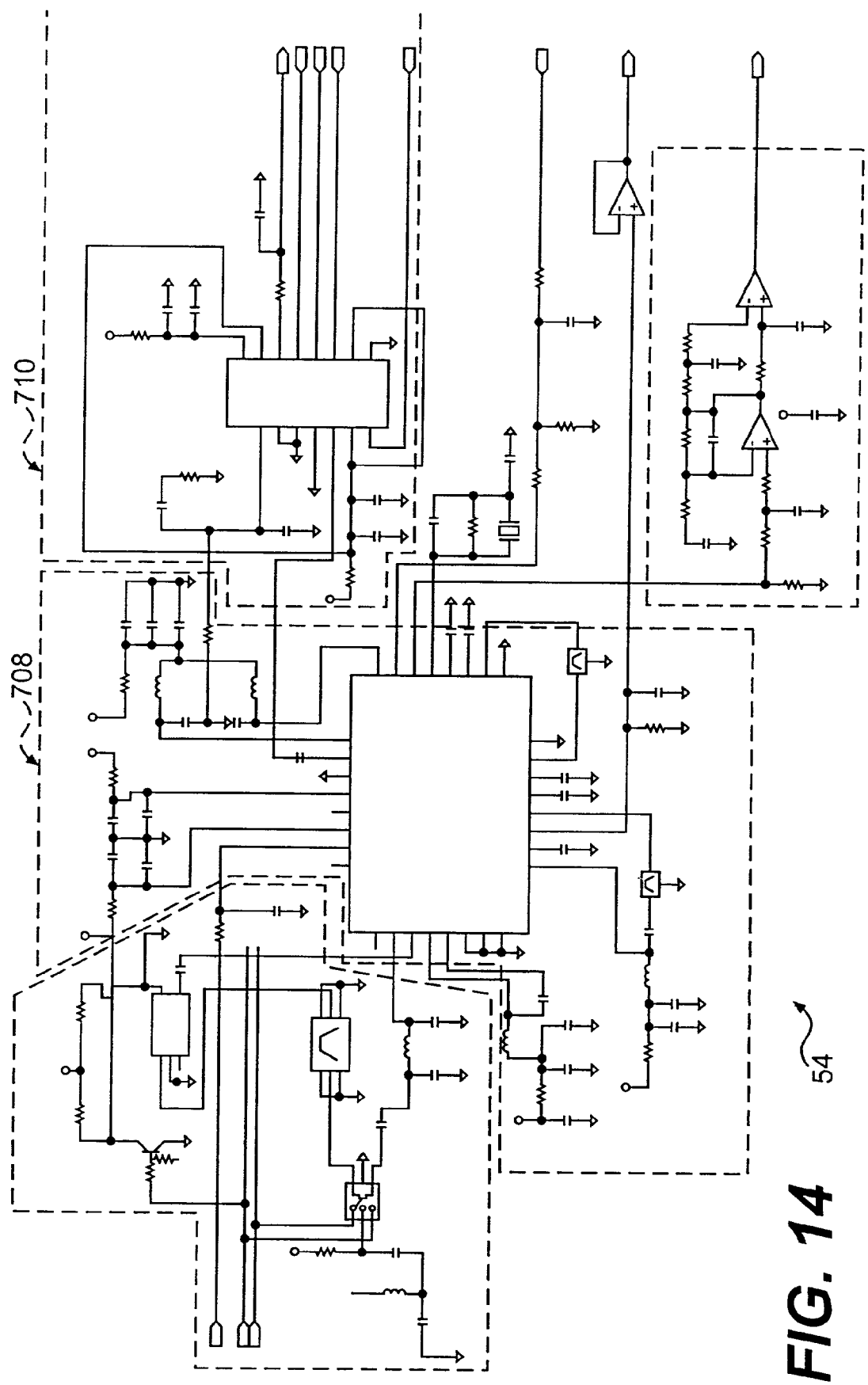
FIG. 14 is a schematic diagram of the RF and data filter section of a child unit 44.

FIGS. 12, 13 and 14 are schematic diagrams of exemplary embodiments of electrical circuitry 54 (FIG. 1) of a child unit 44 (shown in general block diagram in FIG. 3. Circuitry 54 of child unit 44 includes microprocessor unit 720 (see FIG. 3). Microprocessor unit 720 is programmed so as to retain the ID codes 46, rather than generating the ID codes 46.

FIG. 12 shows the baseband and RF deck portions of circuitry 54.

FIG. 13 is a schematic diagram of the control section of a child unit 44. A low battery detect circuit 74 presents a linearly scaled representation of the battery voltage onto port AN4, pin 7 of the transceiver 708. In order to switch the scaled battery monitor voltage onto AN4 (pin 7), the PWR_ON_LATCH (RC5) must be set low. The purpose for switching the input is to provide latchup protection to transceiver 708 by preventing any voltage to be presented to the AN4 port before transceiver 708 has a stable regulated source VCC. Transceiver 708 may need to be implemented to read the voltage on port AN4.

Figure 17:
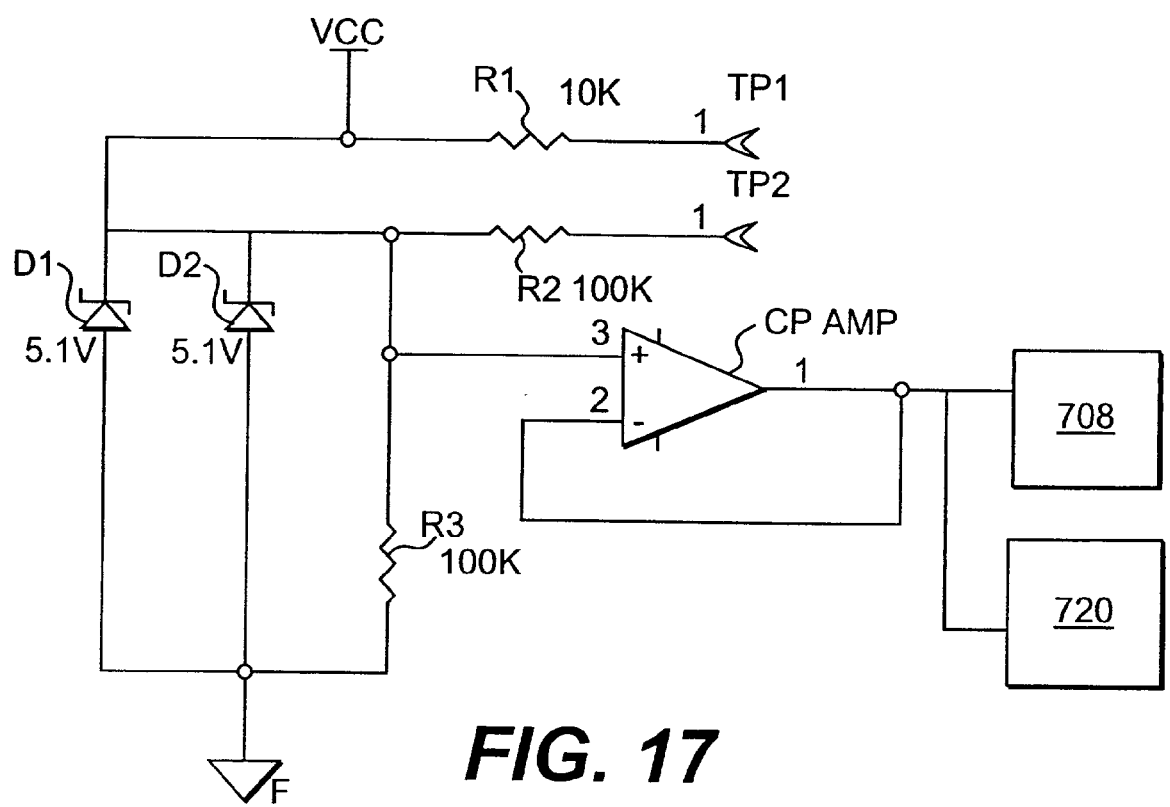
FIG. 17 is a schematic diagram of an exemplary logical structure of a water detection circuit.

A water detector circuit 85 is shown in the upper left portion of FIG. 13 and is shown in greater detail in FIG. 17. Sound generator 722 including speaker 71 are shown in the upper right portion of FIG. 13. The circuitry 54 also includes a power supply 77 and a voltage regulator 78. A RF oscillator 57 may be coupled to the microprocessor unit 720 to supply RF oscillation thereto.

FIG. 14 is a schematic diagram of the RF and data filter section of a child unit 44. Included are circuit details of transceiver 708 and frequency synthesizer 710.

Figure 15:
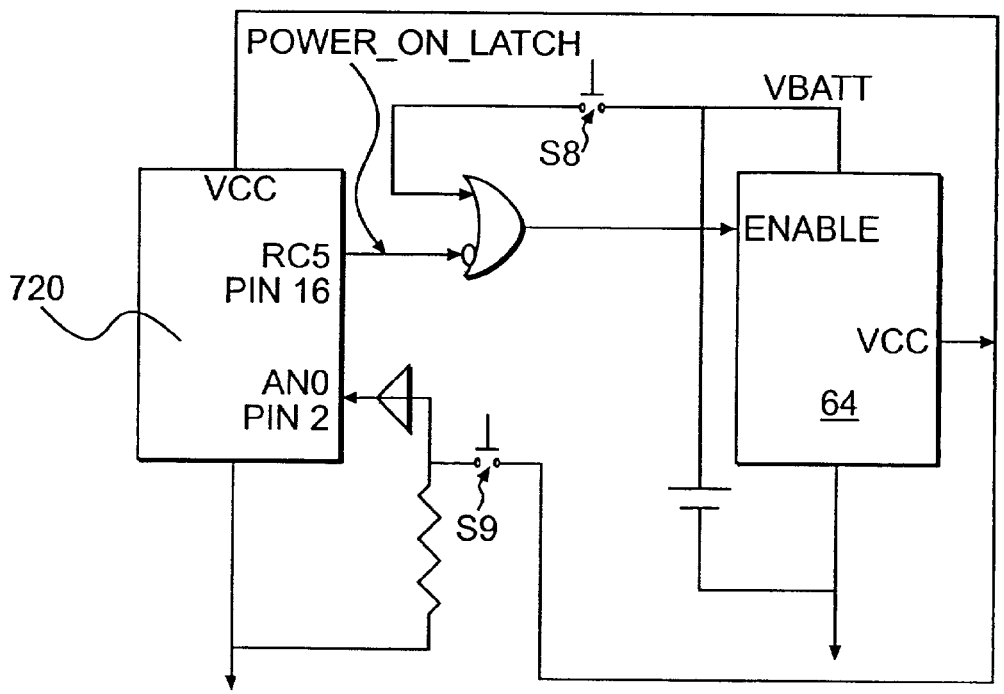
FIG. 15 is a schematic diagram of an exemplary logical structure of the power control circuitry of a child unit 44.

FIG. 15 is a schematic diagram of an exemplary logical structure of the power control circuitry of a child unit 44. As illustrated, the logical structure of power control circuitry in the child units 44 is similar to the logical structure of power control circuitry in the parent unit 42, but the range select switch 65 is not implemented on the child unit 44.

In this exemplary embodiment, the power button is two normally open switches ganged together, S8 and S9 in one of the child units 44. When the power button is depressed, the switches S8 or S9 in one of the child units 44 are closed. The child units 44 are powered on by pressing the power button (S8 or S9). The child unit 44 is powered off through software control initiated by the parent unit 42. It may be preferable for the power off command to be transmitted to the child unit 44 from the parent unit 42 using radio frequency (RF). Other types of wireless communication could be used, but other types of communication, such as wired communication, may be used as well.

In child units 44, the power button (S8 or S9) may constitute a signal actuating circuit i.e., a help button, after the child unit 44 is fully powered on. The state of the help button (i.e., S9) is monitored on port AN0 pin 2 of the microprocessor unit 720. In the exemplary embodiment, when the value on the port AN0 pin 2 of the microprocessor unit 720 reads a logical high, then the help button (i.e., S9) is being depressed or activated on the child unit 44.

As in the parent unit 42, a transceiver system 706 is operatively coupled to microprocessor unit 720. The transceiver system 706 comprises at least one antenna 702 configured to receive the ID code 46 and command signals from the transceiver system 514 in the parent unit 42. The antenna 702 is configured in circuit so as to be coupled to the transceiver system 706.

A frequency synthesizer 710 and a transceiver 708, such as for example a transceiver or RF chip, such as RF chip 2945, may be implemented in the child units 44. The frequency synthesizer 710 may be identical in structure and operation to the frequency synthesizer 520 in parent unit 42.

Figure 16:
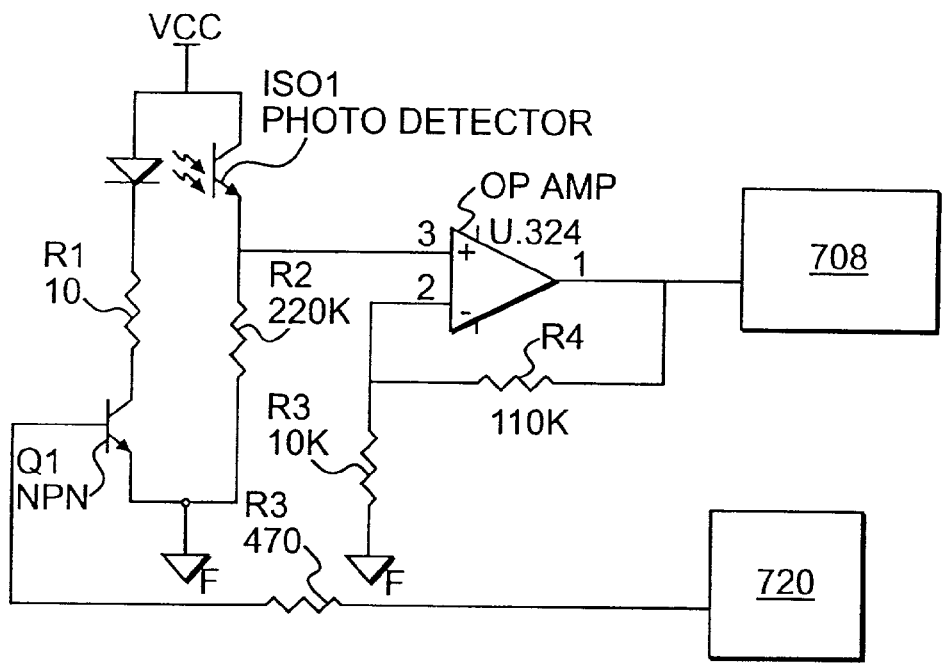
FIG. 16 is a schematic diagram of an exemplary logical structure of the proximity detection circuit.

FIG. 16 shows the logical structure of the proximity detection circuit implemented in the child units 44. A proximity detection circuit 84 may be implemented in the child unit 44 to detect removal of the child unit 44 from its carrier, e.g. a child carrying the child unit 44. For example, when microprocessor unit 720 asserts RB1 (pin 22) high, transistor Q1 conducts, which provides a current flow through the LED diode associated with the photo detector. IR light is then scattered into the region of detection. If a reflecting surface is within the detectable range, IR light is reflected back to the sensor and enters the photo diode of the photo detector. The corresponding increase in emitter current from the photo diode is developed across R2. An amplifier set to unity gain (hereafter referred to as operational amplifier Op Amp) amplifies the voltage developed across R2 and presents the amplified voltage as the analog to digital input of microprocessor unit 720. Any value greater than 0.5 volts on the output of the Op Amp indicates that the child unit 44 has been removed or become detached from its carrier.

Adjusting the gain of the Op Amp can change the sensitivity (range) of the proximity detection circuit 84. The value of R1 may help to control sensitivity, e.g., distance the child unit 44 may be displaced from its carrier.

FIG. 17 illustrates an optional water detection circuit 85 implemented in the child units 44. The child units 44 can operate without the water detection circuit 85 and its associated components. The water detection circuit 85 is configured to detect water so that the child units 44 may provide the user with some protection against potential water hazards. In the exemplary embodiment, water detection is accomplished by measuring the amount of conductivity contained in the water sample. Test points TP1 and TP2 are metallic contacts, exposed to a water source (not shown). TP1 provides a current source for determining the conductivity of the water source. The current is limited to a maximum, i.e., 3.0 micro-amperes, via the limiting resistor R1. Current passes out of TP1, through the water source and into TP2, through resistors R2 and R3. Resistor R3 acts as a final load for the water detection circuit. The voltage developed across R3 is proportional to the current flow through the water. The voltage is then buffered and driven into transceiver 708, for example, driven into the analog input, as well as a digital input interrupt pin.

Zener diodes D1 and D2 act as voltage suppressors to provide static voltage protection when human contact places a large static voltage across the external test points TP1 and TP2. It may be preferable for resistor R2 to be a small value, so as to provide a static load discharge time constant. Resistor 2 will otherwise not affect the water sensing of the water detection circuit.

In the illustrated embodiment, the maximum response of the detection occurs when TP1 and TP2 have a low conductance path (i.e. a wire) between them. It may be preferable to construct the water detection circuit so that both tap water and processed water exhibit an output sufficient to cause the input threshold to be crossed, that is, so that they both will be detected.

In the illustrated embodiment, transmitted and received data signals are coded over symbols that are arranged into a Manchester code. The relationship of symbols to bits and the Manchester code is shown graphically in FIG. 18. Preferably, the parent unit 42 and the child units 44 use a 2-level FSK modulation at 10K symbols per second, such as binary FSK. However, other modulation techniques may be used as well. Although Manchester encoding is employed in the exemplary embodiment, any encoding may be implemented to provide a zero DC component in the data and also a balanced frequency spectrum.

Figure 18:
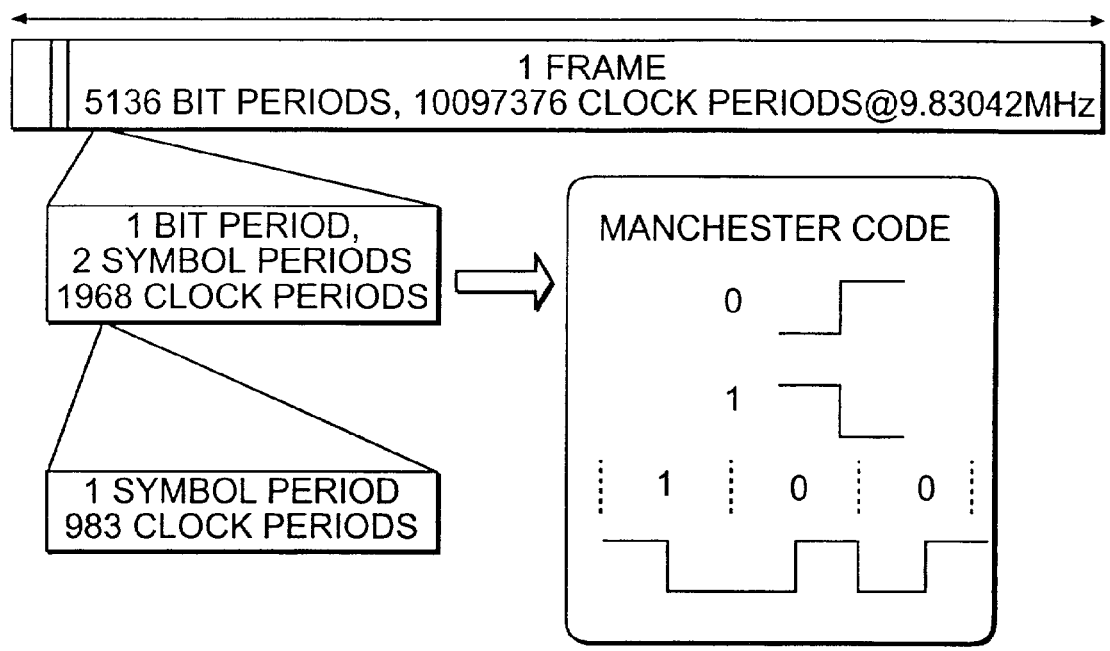
FIG. 18 is chart illustrating the relationship of symbols to bits and the Manchester code according to an exemplary embodiment.

As previously described, it may be preferable for the clock 57 to run at 9.8304 MHz. Each symbol period lasts for 983 of those clock periods. Each data bit it represented by two symbols, i.e., 1966 clock periods. The Manchester symbol rate may be 9.877 kHz (390 clocks/symbol) and the data rate may be 4.938 kHz. As best seen in FIG. 18, the Manchester code has a rising or falling edge in the middle of each bit period. A rising edge indicates a '0' and a falling edge indicated a '1'. At the end of a bit period, another edge may be necessary to prepare for the direction of the edge in the following bit period. For example, 1 bit time would be 62 counts of timer one with a timer setup of 0×30 (1:8 Prescaler).

It may be preferable for the device 40 to operate on a frequency range of 902.224 MHz to 927.476 MHz, wherein there may be as many as sixty channels on the frequency band. Each of the channels have a bandwidth of approximately 330 kHz and being spaced from one another by approximately 428 kHz.

In the exemplary embodiment, the transceivers 516, 708 may operate in one or more operative modes, such as, for example, powered down, transmit, receive and tracking modes, respectively. The operation mode of the transceivers 516, 708 may be dependent on the state of the TX_EN and RX_EN signals. For example, if the RX_EN signal is 0 and the TX_EN signal is 0, then the microprocessor unit enters sleep mode. When the transceivers 516, 708 are in sleep mode, all circuits of the transceivers 516, 708 are powered down and power may be conserved.

Other states of the TX_EN and the RX_EN may also be possible. For example, if the RX_EN signal is 0 and the TX_EN signal is 1, then the transceiver controller might enter a transmit mode. If the RX_EN signal is 1 and the TX_EN signal is 0, then the transceiver controller might enter receive mode and if the RX_EN signal is 1 and the TX_EN signal is 1, then the transceiver controller might enter VC0 mode.

The states of the TX_EN and the RX_EN may also cause the transceiver controller to enter different modes than described above. For example, if the RX_EN signal is 1 and the TX_EN signal is 1, then the controller transceiver might enter receive mode rather than VC0 mode.

In the illustrated embodiment, the monitoring and locating device 40 is not commanded to pass from sleep mode to transmit mode, but rather pass from transmit mode to receive mode or from transmit mode to sleep mode monitoring and locating device 40 may first pass through track mode. Also, to turn the monitoring and locating device 40 on from sleep mode to track mode, it may be preferable for the monitoring and locating device 40 to pass through its receive mode.

Figure 19:
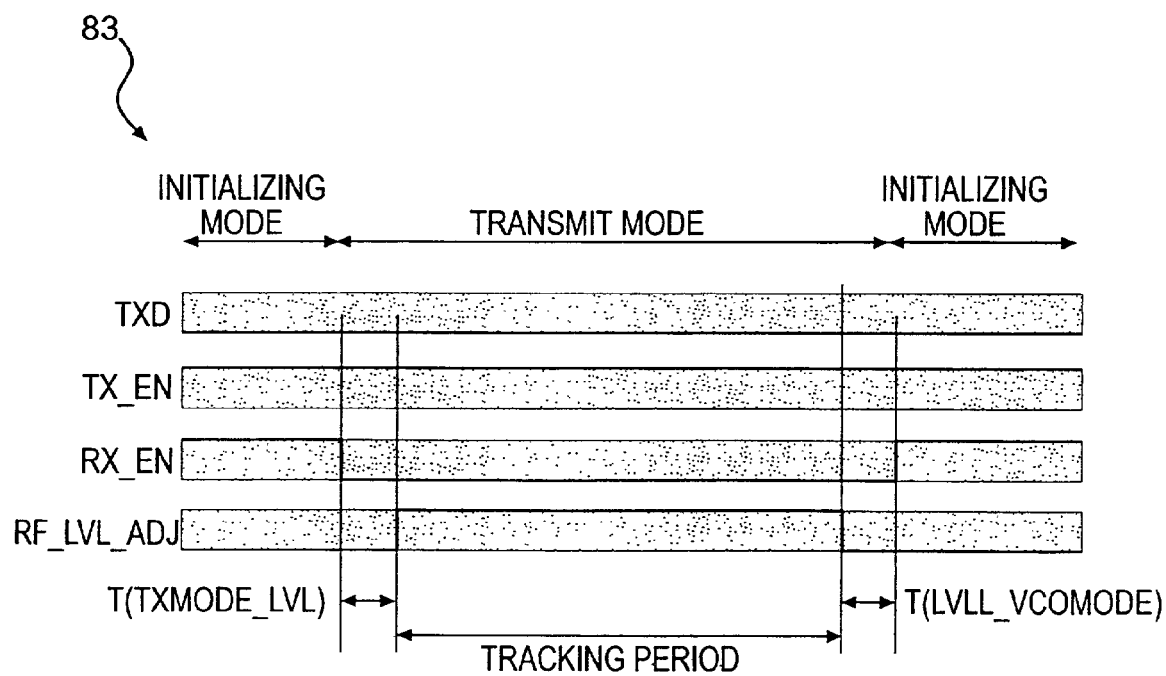
FIG. 19 is chart illustrating the tracking transmission of the child units according to an exemplary embodiment.

As best shown in FIG. 19, tracking transmission in the child unit 42 is achieved by performing a transmit burst with the TXD signal (RC6, pin 17 of the transceiver 708) held either high or low, so as to transmit a continuous wave (CW) signal. TXD can be any state that remains constant throughout the tracking time, since the radio hardware will remove the DC component from TXD.

Figure 20:
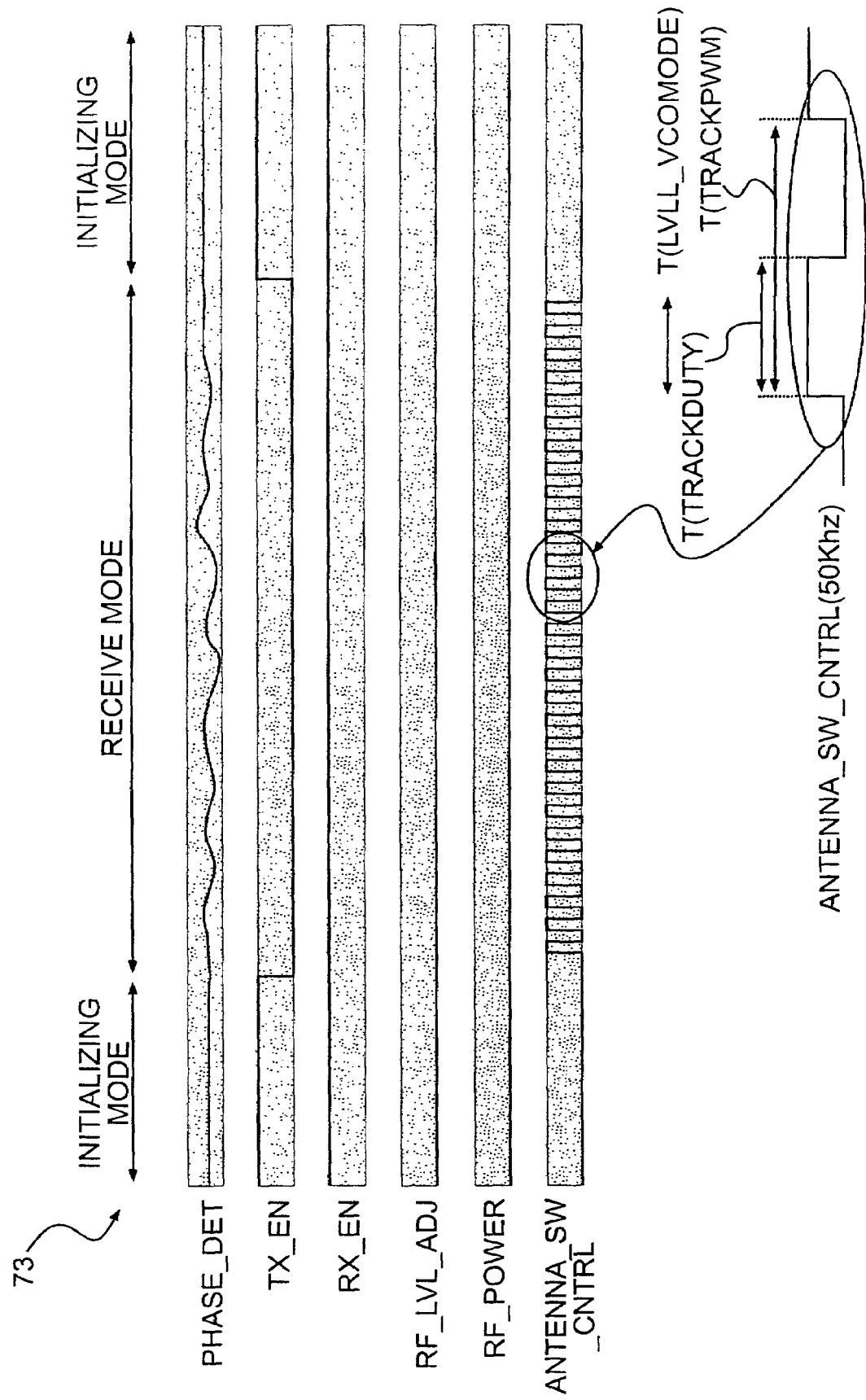
FIG. 20 is a chart illustrating the direction finding mode timing of the parent unit implemented according to an exemplary embodiment, the direction finding mode is being used with antenna switching for phase detection.

As best shown in FIG. 20, the pulse width modulator (PWM) in the parent unit 42 is a shared resource for both the transmit and receive modes of the transceiver 706. In the exemplary embodiment, two modes of receive are available. One receive mode may be a tracking receive and the other may be a poll receive. When in tracking receive mode, the PWM is used to switch between antennae 502, 504. When in poll receive mode, the PWM is disabled and the signal ANT_SW_CNTL is used to switch between the two antennae 502, 504. It may be preferable that the antenna switching alternate between each antenna every transmit/receive pair during poll receive mode.

To receive the tracking receive signal, the transceiver system 514 of the parent unit 42 must enter receive mode and output a signal, such as a 50.7 Khz, 50% duty cycle square wave, onto PWM OUT port, RC2, pin 13 of microprocessor unit 510. This switching action enables microprocessor unit 510 to indicate a relative phase difference in the separate receiving antennae 502, 504. The analog value on a PHASE_DET pin (Port AN2, pin 4 of microprocessor unit 510) may be sampled to acquire a measure of the phase difference between the two received signals, one from each antenna 502, 504.

For example, the energy value or analog value, e.g., a voltage signal, is determined corresponding to a directional coordinate of each child unit 44 based at least in part on the phase difference in the separate receiving antennae 502, 504. In the illustrated embodiment, if the voltage is less than a first predetermined voltage level, such as 0.8 volts, then the child unit 44 is positioned at a location to the left of the parent unit 42. If the voltage level is greater than the first predetermined voltage level, such as 1.3 volts, and less than a second predetermined voltage level, such as 1.5 volts, then the child unit 44 is positioned in line with the parent unit 42. If the voltage level is greater than the second predetermined energy value, such as 1.7 volts, then the child unit 44 is positioned at a location to the right of the parent unit 42. The voltage levels are relative to the energy supply and thus are described as exemplary in nature and should not limit to the present invention in any way.

In general, the signal could be a voltage signal or any other energy level or signal since voltage is representative of only one component of power or total energy.

The rate of sampling PHASE_DET may be sufficiently high so as to avoid a time lag effect between the user moving the parent unit 42 or the child units 44 and the resultant phase change may be made apparent on the direction LEDs 75, such as, for example, by lighting the left, center, or right LED. The lighting speed or frequency of the direction LEDs 75 may be varied in accordance with the resultant phase change.

Additionally, a LCD meter may be provided in the parent unit 42 to indicate the strength and the direction of the signal. For example, the LCD meter can have any number of graduations with a certain number of the graduations representing a strong signal or correct direction and with a different number of graduations representing a weak signal or wrong direction. The speaker 71 may provide sound in accordance with the direction LEDs or the LCD meter.

It may be preferable to employ further digital filtering at a sample rate of 1 MHz and then averaging the results over a predetermined number of samples, for example, 500 samples.

Alternatively, microprocessor unit 510 may be configured or programmed to convert the voltage signals into display commands representing the relative position of each child unit 44 with respect to the parent unit 42. The microprocessor unit 510 determines the relative strength of the received modulated RF signal from each child unit 44 using a radio signal strength indicator (RSSI), which may be received on port RA1/AN1, pin 3, of the microprocessor unit.

Figure 21:
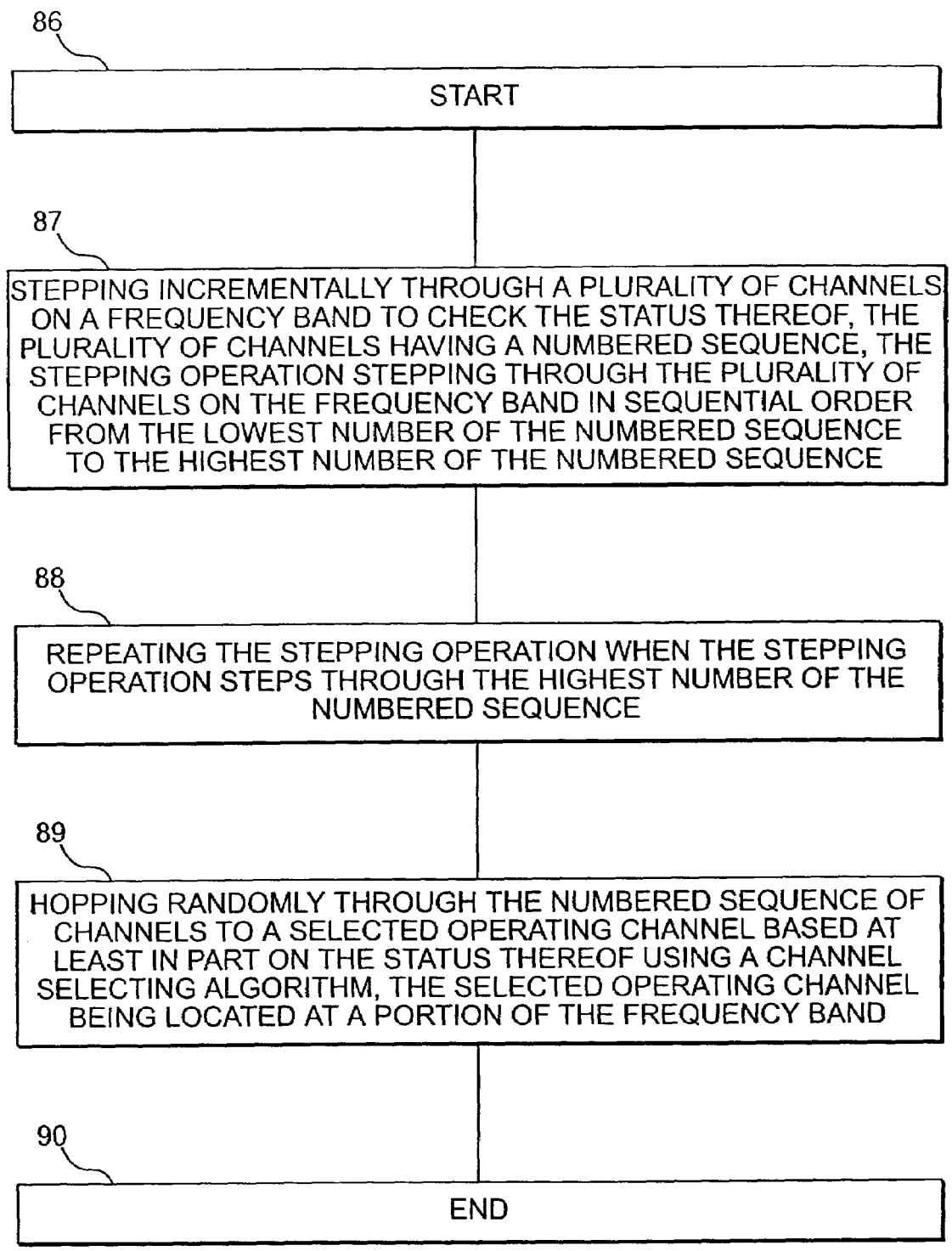
FIG. 21 is a flow chart of an exemplary method for selecting an operation channel.

In situations where the device 40 is used in the presence of other devices 40, such as a shopping mall or an amusement park, as shown in FIG. 21, a method is provided for selecting the operating channel between two or more units in radio frequency communication with one another. As illustrated, the method begins at 86 and control proceeds to 87. At 87, the device 40 steps incrementally through one or more channels on a frequency band to check the status thereof, the one or more channels having a numbered sequence and the stepping operation stepping through the one or more channels on the frequency band in sequential order from the lowest number of the numbered sequence to the highest number of the numbered sequence. Control then proceeds to 88, at which the stepping operation is repeated when the stepping operation steps through the highest number of the numbered sequence. Control proceeds to 89. At 89, hopping randomly through the numbered sequence of channels to a selected operating channel based at least in part on the status thereof using a channel selecting algorithm, wherein the selected operating channel is located at a portion of the frequency band. Control proceeds to 90, at which the method ends.

For best frequency diversity, the selected operating channel may be located at a low portion, middle portion or a high portion of the frequency band.

Having the ability to hop to different channels allows several devices 40 to coexist in the same area, provided they do not hop to the same channels at the same time. It may be preferable to minimize possible conflicts by providing an algorithm derived from the random system ID and having the device 40 hop through the channels based on the algorithm derived from the random system ID. That way, each device 40 would use the channels in a different sequence and would be unlikely to collide.

Obtaining additional random numbers from the child units 44 as they are powered up and incorporating the additional random numbers into the frequency hopping algorithm may also be used to preclude interference between different devices 40.

To maximize frequency diversity, the operation channel could be changed after every sequence, which is a poll and acknowledge with each of the active child units 44.

Figure 22:
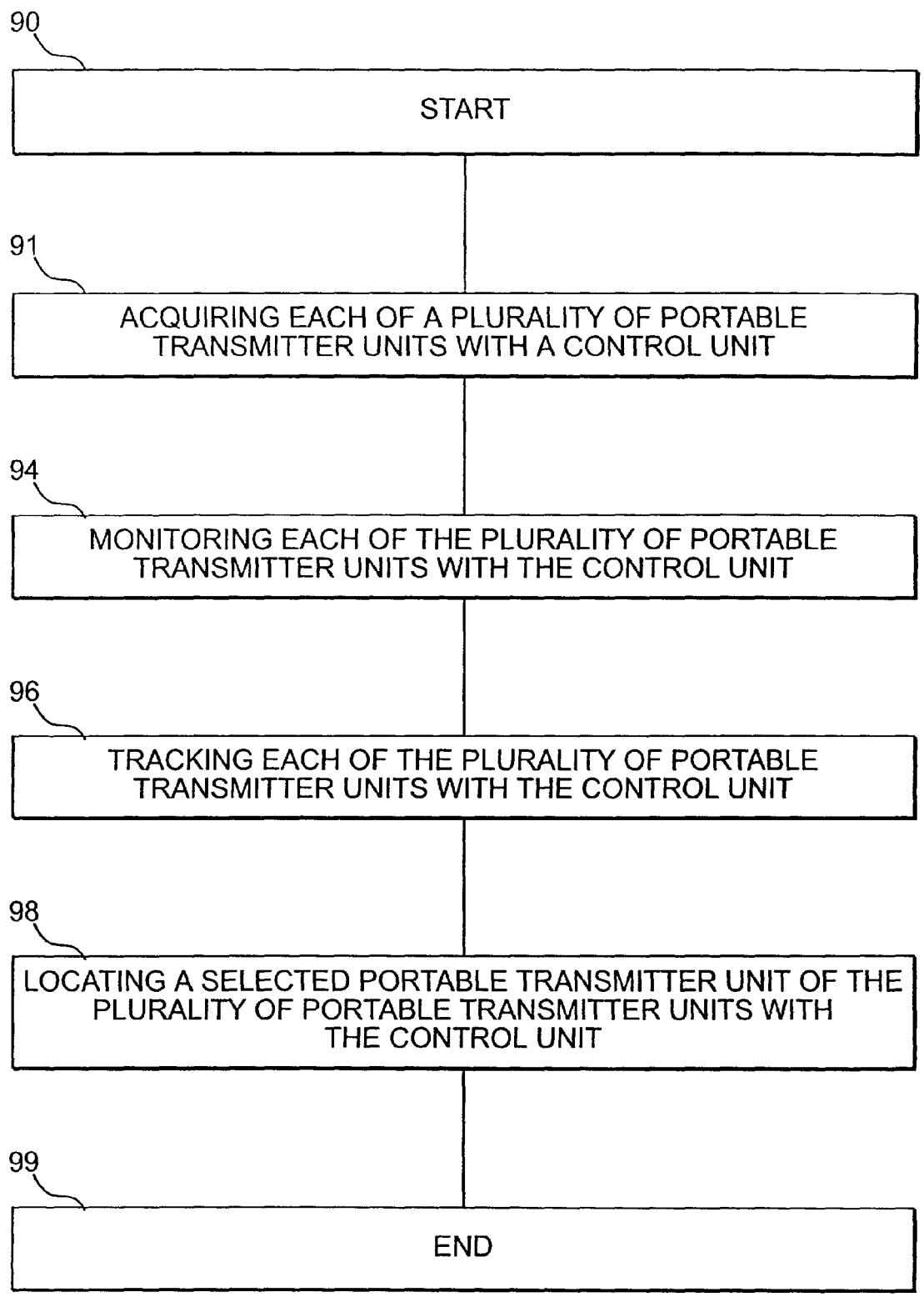
FIG. 22 is a flow chart of an exemplary method of operation.

FIG. 22 illustrates a method designed in accordance with an exemplary embodiment of the invention in which one or more portable remote units, such as child units 44, in communication, such as, radio frequency (RF) with a parent unit, such as parent unit 42, is reviewed following a set of operations. The method begins at 91 and control proceeds to 92. At 92, power is supplied to the child units 44 and the parent unit 42 from the energy sources 63, 77, respectively. Control then proceeds to 93, at which each of the child units 44 is acquired by the parent unit 42. Control proceeds to 94. At 94, the parent unit 42 monitors each of the child units 44. Control then proceeds to 96, at which each of the child units 44 is tracked by the parent unit 44. In the exemplary method, control then proceeds to an optional operation 98, where a selected child unit of the child units 44 is located using the parent unit 42. Control proceeds to 99, where the method ends.

Figure 23:
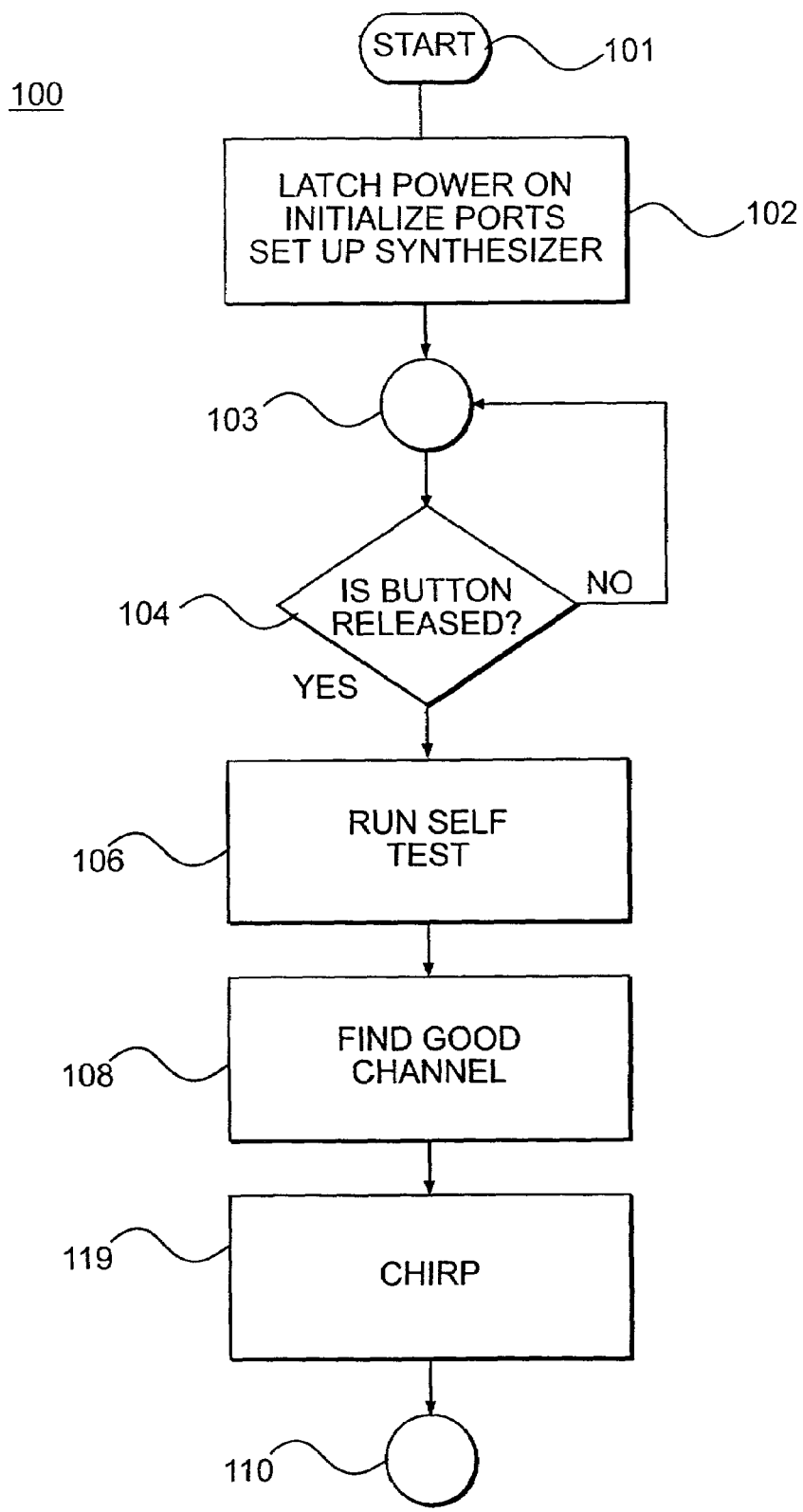
FIG. 23 is a flow chart illustrating operations performed during powering on of parent unit 42.

FIG. 23 illustrates operations performed during initialization of the parent unit 42 in accordance with the exemplary embodiment of the invention. The method begins at 101 and control proceeds to 102. At 102, the power is latched on (i.e., by pressing the power button S6, S7 of the parent unit 42), the imports are initialized, and the frequency synthesizer 72 is set up. Control then proceeds through blank node 103 to 104, at which a determination is made whether the power button (S6, S7) has been released. If the power button is released, the ID codes 46 may be randomly generated and control proceeds directly to 106. If not, control proceeds to blank node 103. At 106, the parent unit 42 runs a self-test and control proceeds to 108. At 108, the parent unit 42 selects an operating channel using the frequency synthesizer 72 and the RSSI level and chirps through the speaker 71. Control then proceeds to 110, where a power conservation operation is performed.

Figure 24:
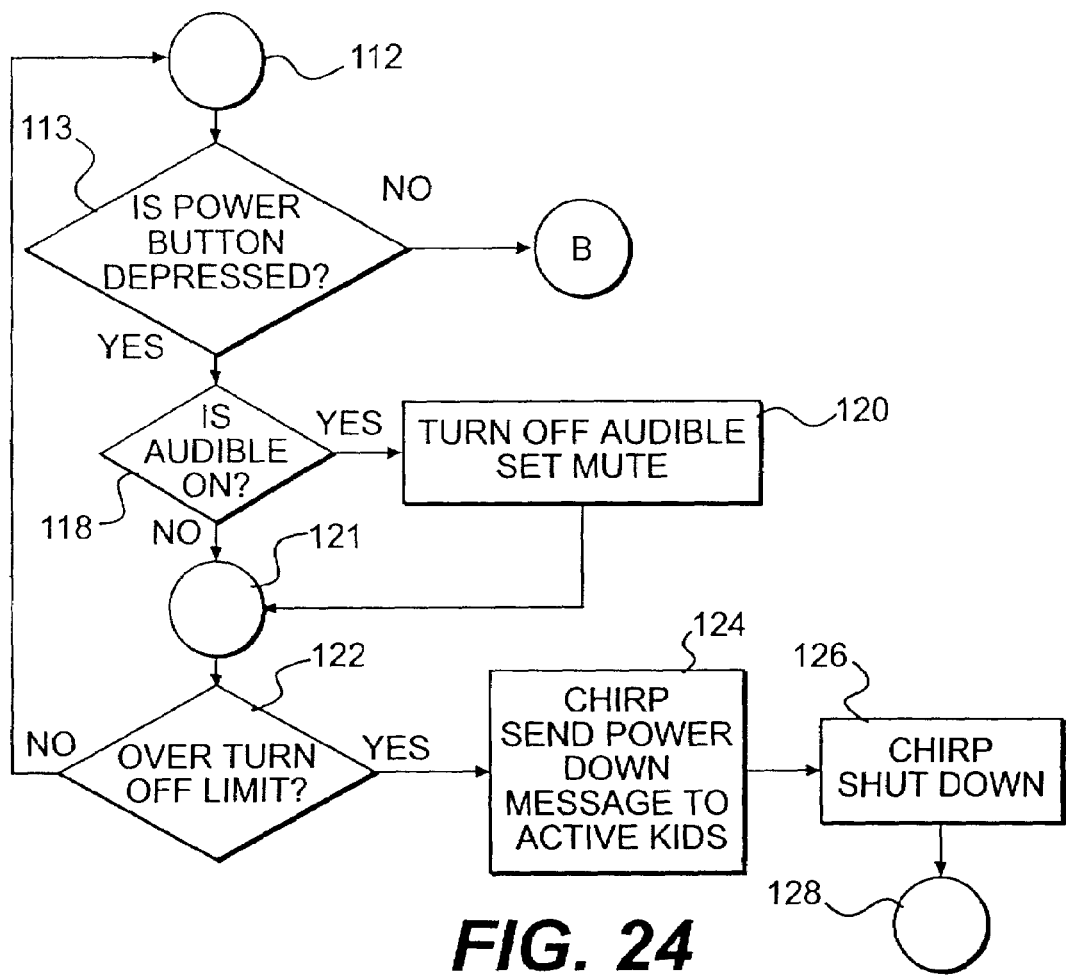
FIGS. 24 and 25 are flow charts illustrating operations performed during power down of parent unit 42, FIG. 24 showing detail of step 110.
Figure 25:
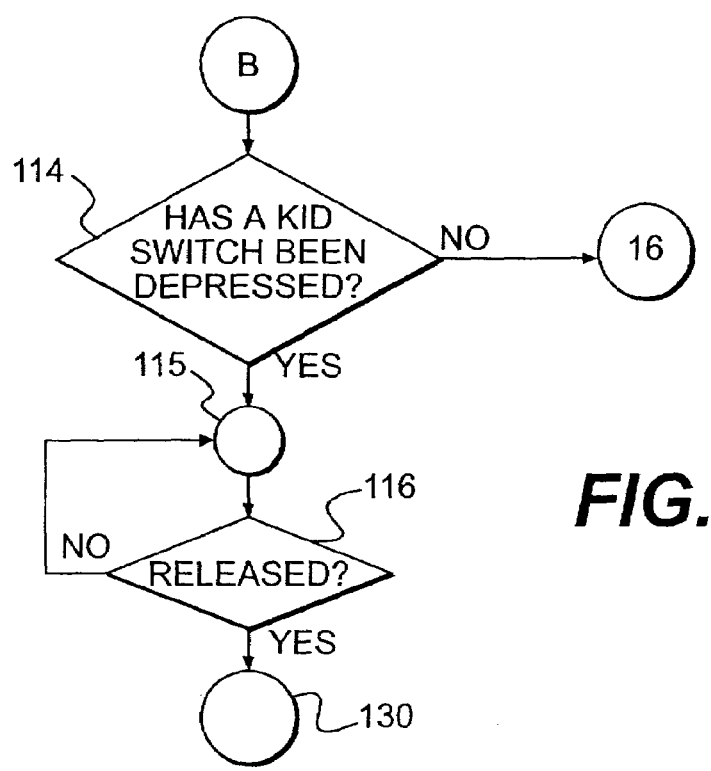

FIGS. 24 and 25 illustrate the power down operation that is performed in the parent unit 42. The power down operation begins at 112 and control proceeds to 113. At 113, a determination is made whether the power button (S6, S7) has been depressed. If the power button (S6, S7) has been depressed, control proceeds directly to 118. If not, control proceeds directly to 114. At 114, a determination is made whether one of the child switches has been depressed. If one of the child switches has been depressed, control proceeds directly to 116 through blank node 115. If not, control proceeds directly to 160. At 116, a determination is made whether the child switch has been released. If the child switch is released, control proceeds to 130. If not, control proceeds to blank node 115.

Figure 29:
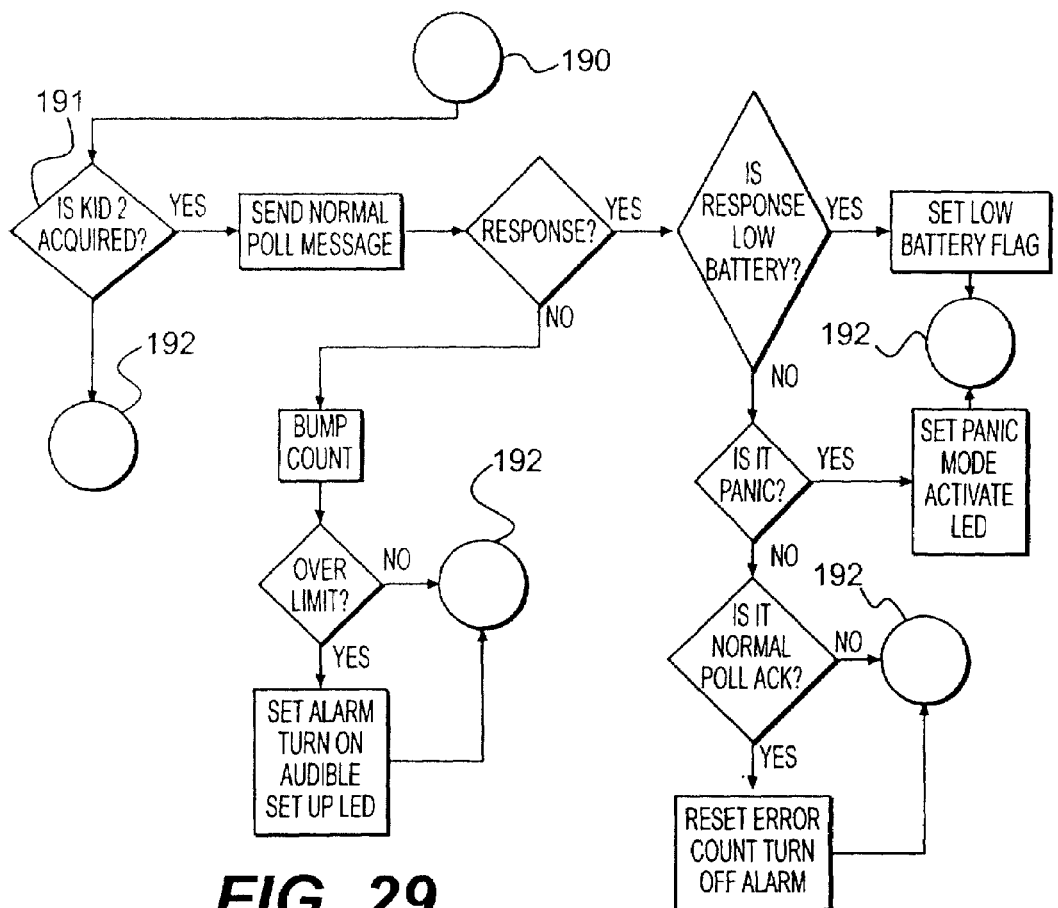
FIG. 29 is a flow chart illustrating operations performed during polling in accordance with the exemplary embodiment of the invention for a second child unit 44.
Figure 30:
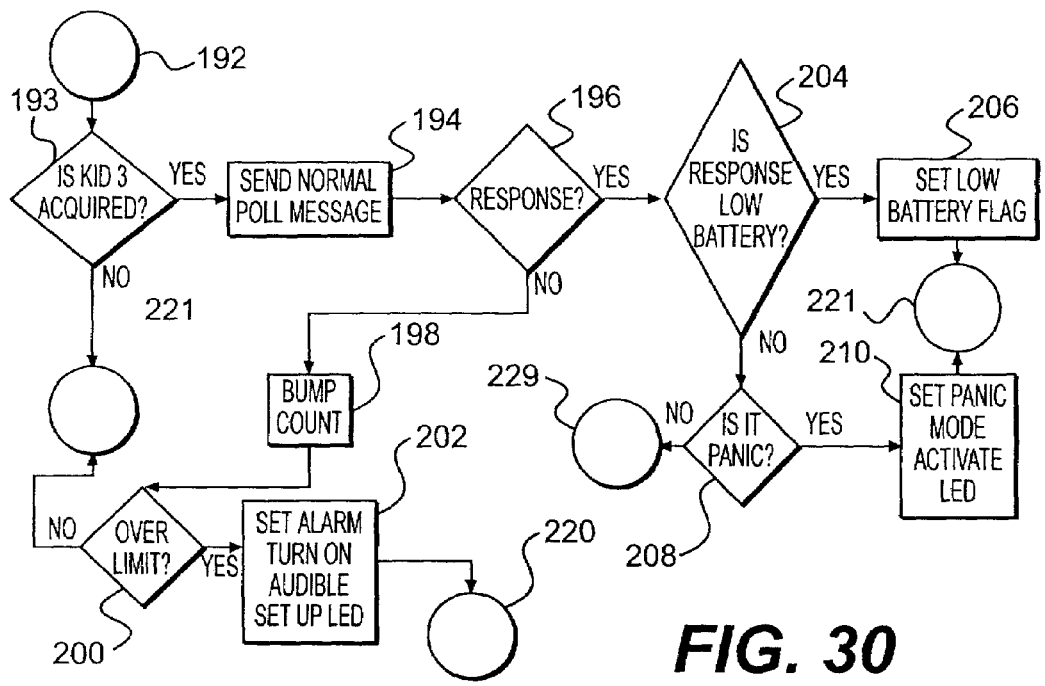
FIG. 30 is a flow chart illustrating operations performed during polling in accordance with the exemplary embodiment of the invention for a third child unit 44.
Figure 31:
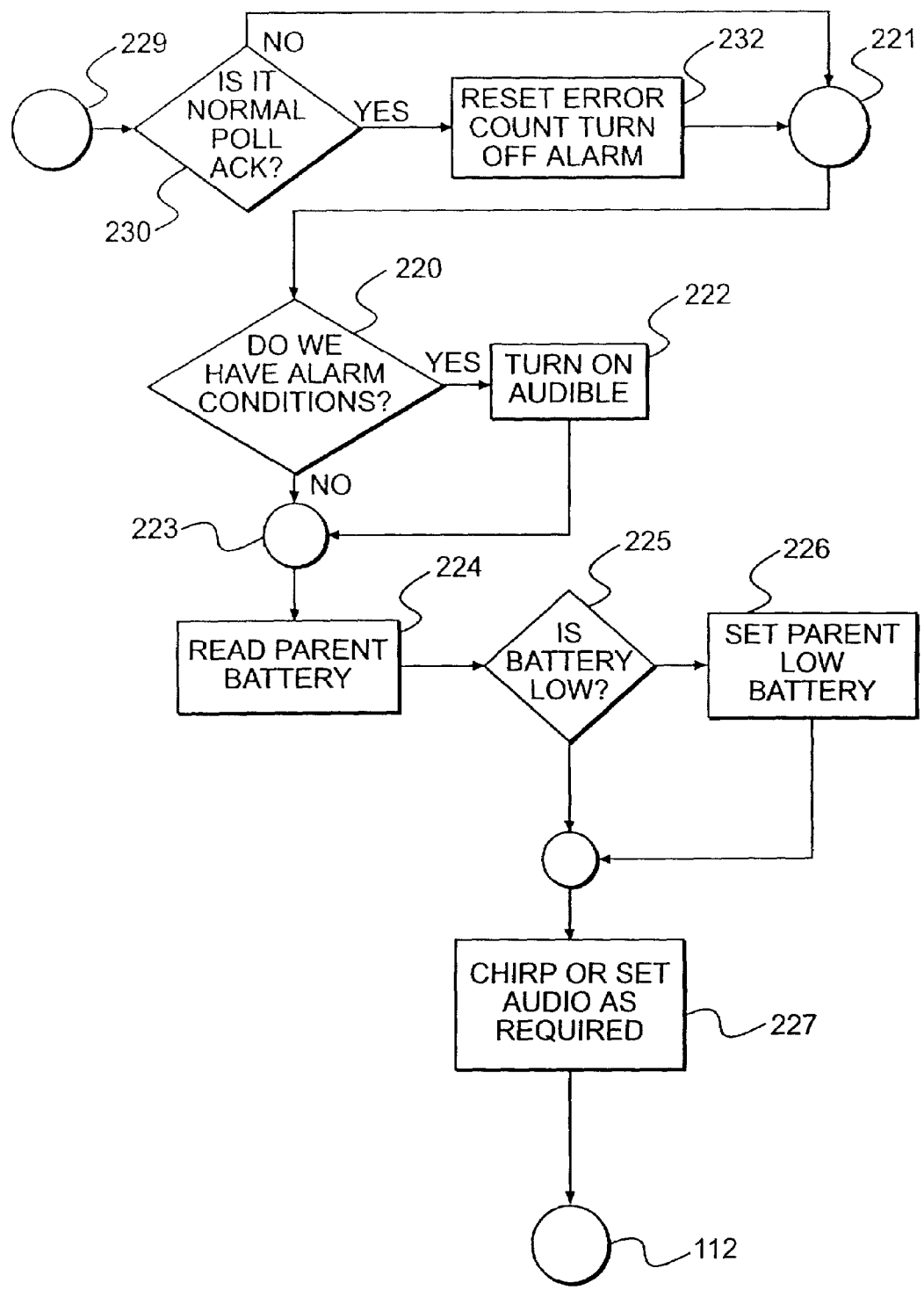
FIG. 31 is a flow chart illustrating operations performed during poll response checking in accordance with the exemplary embodiment of the invention.
Figure 32:
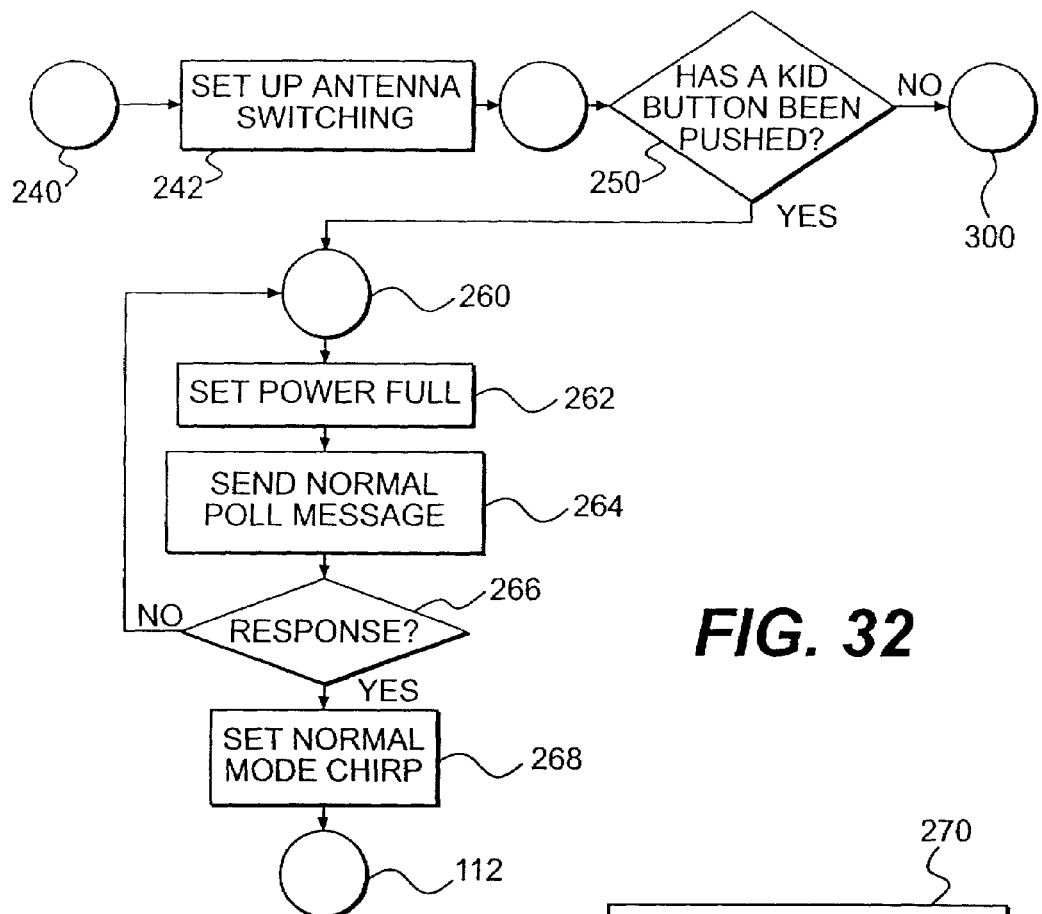
FIGS. 32 and 33 are flow charts illustrating operations performed during tracking in accordance with the exemplary embodiment of the invention.
Figure 33:
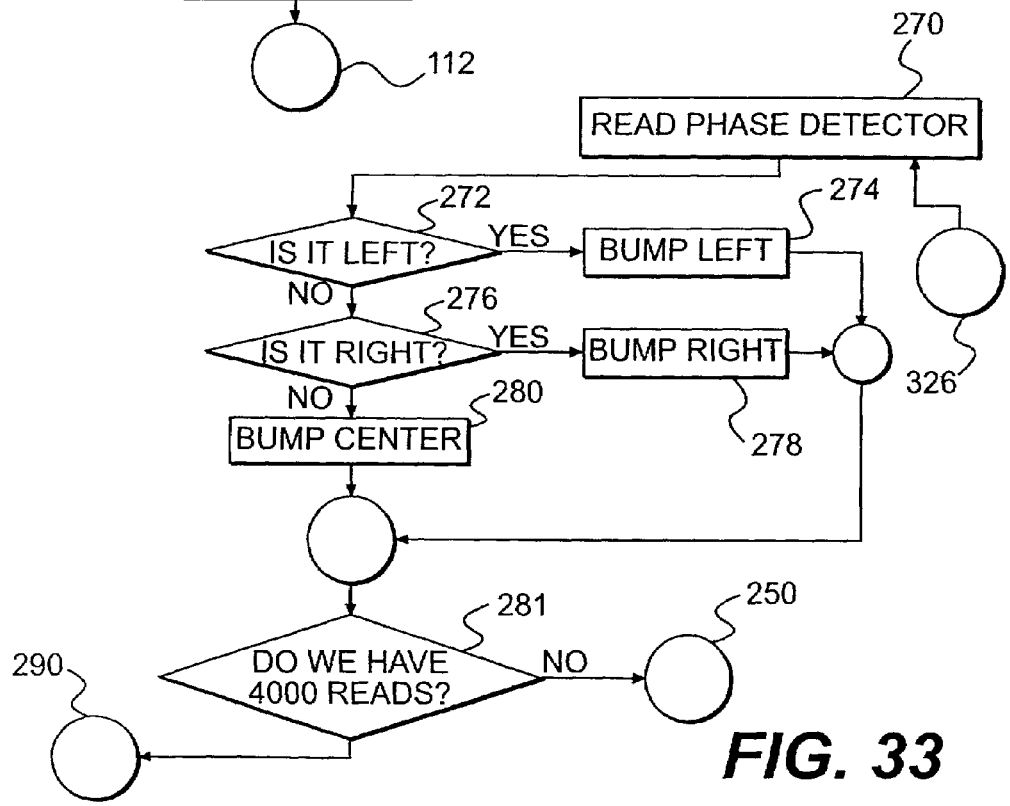

At 118, after the power button (S6, S7) or the child switch has been depressed, a determination is made whether the speaker 71 or audible is on. If the audible is on, control proceeds directly to 120. If not, control proceeds to 121. At 120, the speaker 71 is turned off and muted. Control then proceeds to blank node 121. From blank node 121, control proceeds to 122, where a determination is made whether the parent unit 42 exceeds a predetermined time limit. If the parent unit 42 does exceed the turn-off limit, then control proceeds to 124. If not, control proceeds to 112, where the power conservation operation begins. At 124, the parent unit 42 chirps through the speaker 71 and sends power down message to any active child units 44. Control proceeds to 126, at which the parent unit 42 chirps through the speaker 71 and shuts down circuitry 50. The status check operation 130 is illustrated in FIG. 27 and the operation 160 is illustrated in FIGS. 28, 29 and 30.

Figure 26:
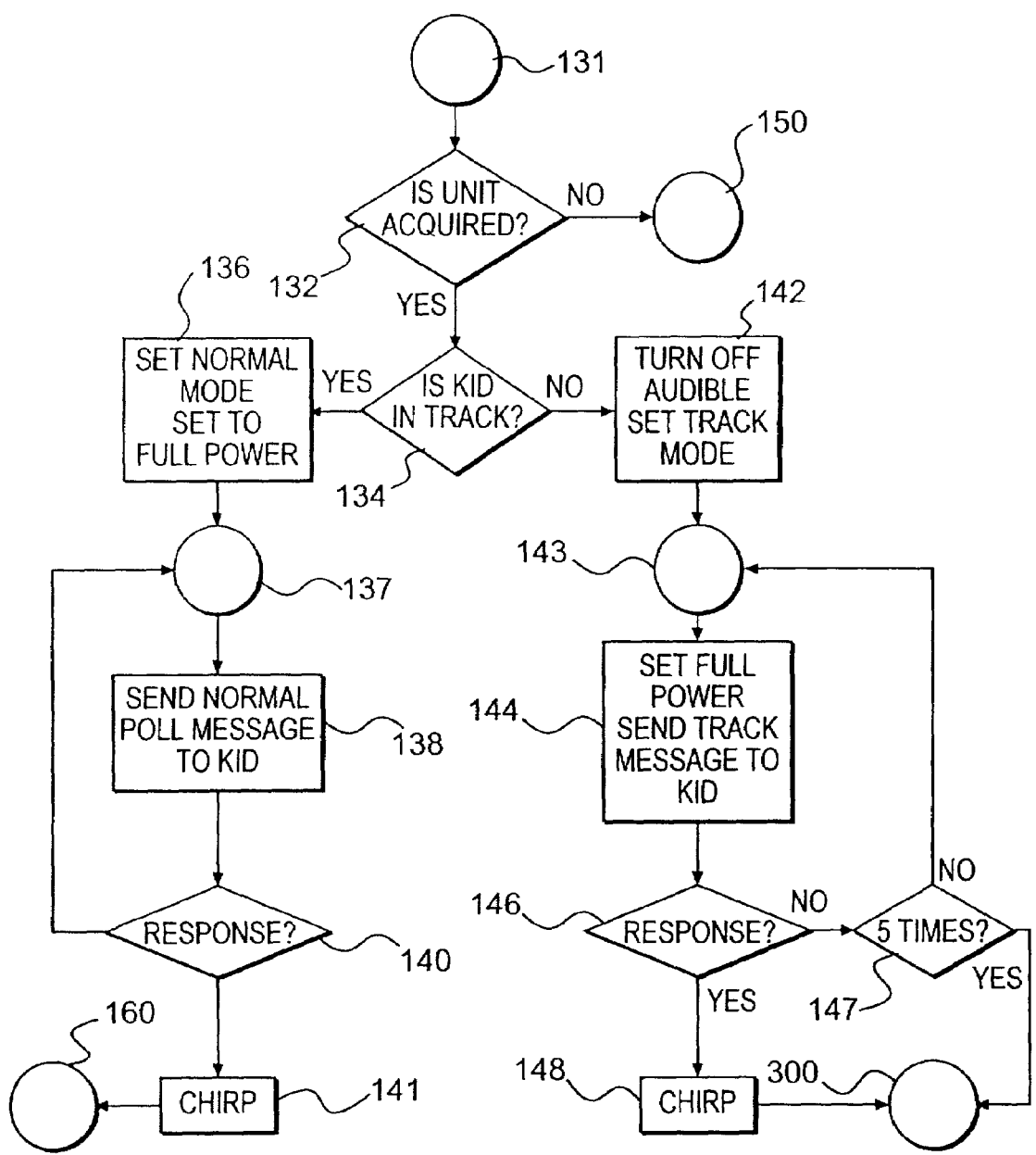
FIGS. 26 and 27 are flow charts illustrating operations performed during a status check of the parent unit, FIG. 26 showing detail of step 130 and FIG. 27 showing detail of step 150.
Figure 27:
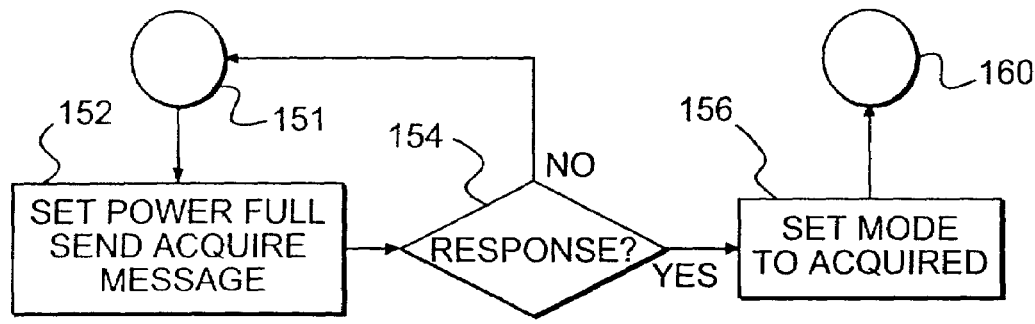

FIGS. 26 and 27 illustrate operations performed during a status check in accordance with the exemplary embodiment of the invention. The operations begin at 131 and control proceeds to 132. At 132, it is determined whether a child unit is acquired. If so, the parent unit 42 chirps through speaker 71 and control proceeds to 160. If not, control proceeds to 150, as will be described in greater detail below. At 134, a determination is made whether one of the child units 44 is in track by the parent unit 42. If so, control proceeds directly to 136. If not, control proceeds directly to 142. At 136, the parent unit 42 is set to normal mode and to full power. Control proceeds directly to 138, at which the parent unit 42 sends normal poll command or message to the child unit 44. Control proceeds to 140, at which a determination is made whether the child unit 44 has responded to the poll message. If so, the parent unit 42 chirps through speaker 71 and control proceeds to 160. If not, control proceeds to 137. At 142, the microprocessor unit 510 of the parent unit 42 is set to track mode and the speaker 71 is turned off. Control proceeds directly to 144, at which the parent unit 42 is set to full power and sends a track command or message to the child unit 44. Control then proceeds to 146, at which a determination is made whether the child unit 44 has responded to the track message. If so, control proceeds to 148 the parent unit 42 chirps through speaker 71 and control proceeds to 300. If not, control proceeds to 147. This process is repeated up to five (5) times at which time control is passed to 300.

At 150 in FIG. 27, the operations performed during acquire mode in accordance with the exemplary embodiment of the invention are illustrated. The operations 150 begin at 151 and control proceeds to 152. At 152, the parent unit 42 is set to full power and sends an acquire command or message to the child unit 44. Control proceeds to 154, at which a determination is made whether the child unit 44 has responded to the acquired message. If so, control proceeds directly to 156. If not, control proceeds to 151. At 156, the microprocessor unit 510 of parent unit 42 is set to acquire mode and control proceeds directly to 160.

Figure 28:
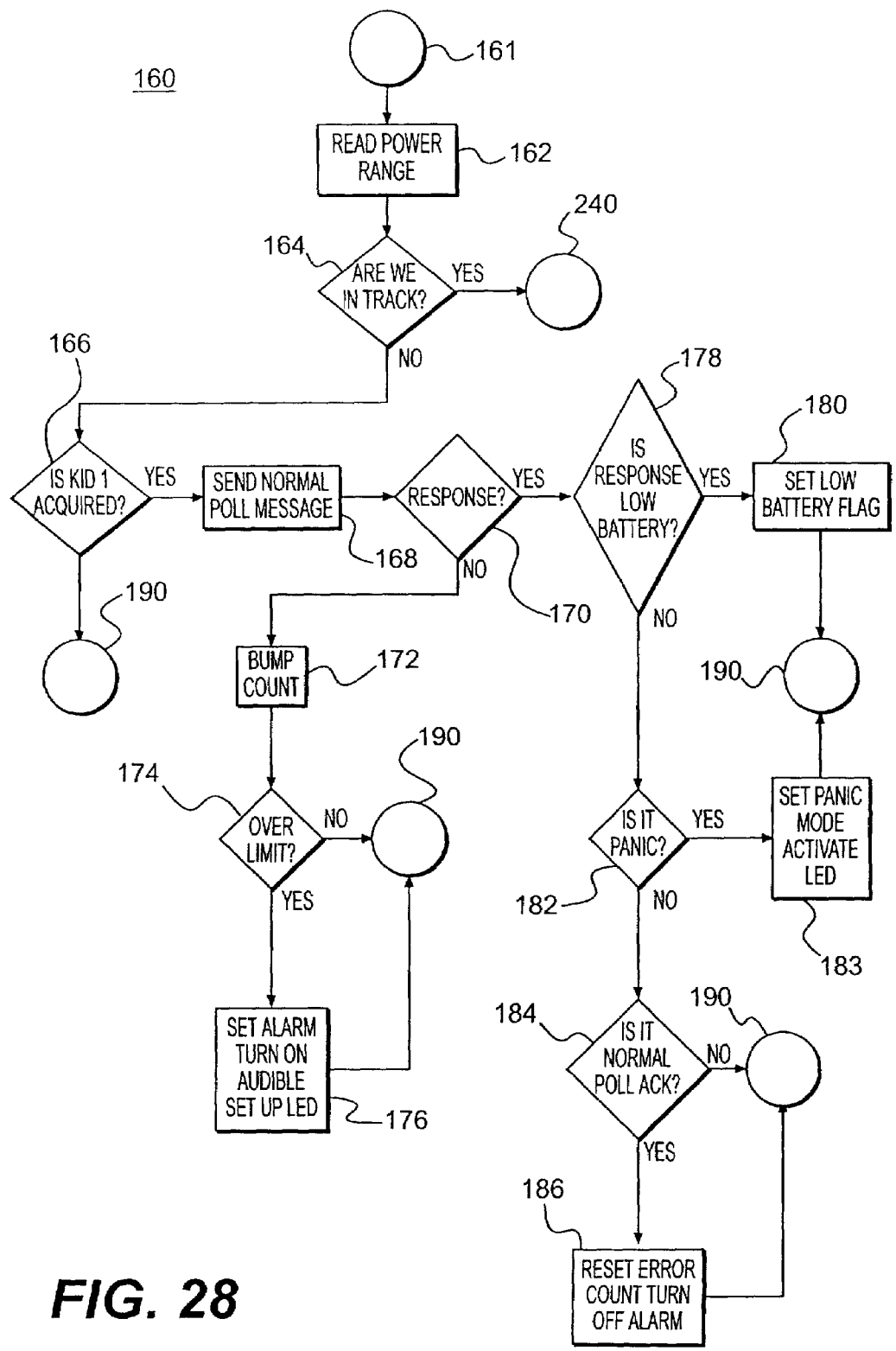
FIG. 28 is a flow chart illustrating operations performed during polling in accordance with the exemplary embodiment of the invention for a first child unit 44.

FIG. 28 illustrates operations 160 performed during polling mode in accordance with the exemplary embodiment of the invention. The operations 160 begin at 161. Control proceeds to 162, at which the parent unit 42 reads a range switch and control proceeds to 164. At 164, a determination is made whether a child unit 44 and the parent unit 42 are in track with one another. If so, control proceeds directly to 240. If not, control proceeds to 166. At 166, a determination is made whether the first child unit 44 is acquired. If so, control proceeds to 168. If not, control proceeds to 190. At 168, the parent unit 42 sends a normal poll command or message to the first child unit 44 and control proceeds to 170. At 170, a determination is made whether the first child unit 44 has responded to the normal poll message. If so, control proceeds to 178. If not, control proceeds to 172. At 172, an error count, i.e., number of successive missed polls, of the child units 44 monitored by the parent unit 42 is bumped upward by one count. Polls may be missed because the child unit 44 does not respond to the parent unit or because the response from the child unit 44 does not reach the parent unit 42, i.e., the distance between the child unit 44 and the parent unit 42 is too far. Control proceeds to 174, at which a determination is made whether the parent unit 42 is over the error count limit. If so, the parent unit 42 sets a perimeter alarm, turns on an audible, and sets up an LED. If not, control proceeds to 190.

At 178, a determination is made whether the first child unit 44 has a low battery using low battery detection circuit 74. If so, control proceeds to 180. At 180, a low battery flag is set and control proceeds to 190. If not, control proceeds to 182. At 182, a determination is made whether the response from the first child unit 44 is a panic command or message. If so, control proceeds to 183. At 183, the panic mode is set and an LED is activated. Control then proceeds to 190. If not, control proceeds to 184. At 184, a determination is made whether the response of the first child unit 44 is a normal poll acknowledgment response. If not, control proceeds to 190. If so, control proceeds to 186. At 186, the parent unit 42 resets the error count, i.e., which is the number of successive missed polls, and turns off the perimeter alarm being generated through the speaker 71.

FIG. 29 illustrates operations performed during polling of the second child unit in accordance with the exemplary embodiment of the invention. Operations illustrated in FIG. 29 with respect to the second child unit 44 that are similar to those described above for the first child unit 44 are given identical reference numerals and are not commented further upon. Control proceeds to 191 from blank node 190. At 191, which is similar to 166 in FIG. 28, a determination is made whether the second child unit 44 is acquired by the parent unit 42. If so, control proceeds to 168 and the description above relating to the first child unit 44 will suffice to give an understanding of the second child unit 44 as well. If not, control proceeds to 192.

FIG. 30 illustrates operations performed during polling of the third child unit 44 in accordance with the exemplary embodiment of the invention. The operations begin at 192 and control proceeds to 193. At 193, it is determined whether a third kit unit 44 is acquired by the parent unit 42. If so, control proceeds directly to 194. If not, control proceeds to 220. At 194, the parent unit 42 sends a normal poll command or message to the third child unit 44. Control then proceeds to 196, at which a determination is made whether the third child unit 44 has responded to the normal poll message. If so, control proceeds to 204. If not, control proceeds to 198. At 198, the error count of the child units 44 monitored by the parent unit 42 is bumped upward by one count and control proceeds to 200. At 200, a determination is made whether the error count is over the predetermined error count limit, i.e., number of successive missed polls. If not, control proceeds to 220. If so, control proceeds to 202. At 202, the parent unit 42 sets the perimeter alarm, turns on an audible, and sets up the LED. Control then proceeds to 220. At 204, it is determined whether the response from the third child unit 44 signals a low battery using the low battery detection circuit 74. If so, control proceeds to 206. At 206, the parent unit 42 sets a low battery flag and control proceeds to blank node 221. If the response from the third child unit 44 did not signal a low battery, control proceeds to 208. At 208, it is determined whether the response from the third child unit 44 was a panic response. If not, control proceeds through blank node 229 to 230. If so, control proceeds to 210, at which the parent unit 42 sets panic mode and activates an LED in the housing 48. Control then proceeds to blank node 221. At 230, it is determined whether the response is a normal poll acknowledgment response. If so, control proceeds to blank node 221. If not, control proceeds to 232. At 232, the error count is reset and the sound generator or alarm is turned off. Control then proceeds through blank node 221 to 220.

At 220, it is determined whether alarm conditions are present, such as, for example, a child button being pressed. If so, control proceeds to 222. If alarm conditions are not met, control proceeds to 224. At 224, the parent unit 42 reads its battery power and control proceeds to 225. At 225, it is determined whether the battery power of the parent unit 42 is low. If so, control proceeds to 226. If not, control proceeds to 227. At 226, the parent unit 42 sets the battery as low and may light a LED to indicate that the battery is low. At 227, the parent unit 42 may chirp or set an audio signal through the speaker 71 as required. Control then proceeds to 110.

FIG. 30 illustrates operations performed during tracking mode in accordance with the exemplary embodiment of the invention. The operations begin at 241 and control proceeds to 242. At 242, the parent unit 42 sets up the antenna switching, as described above, and control proceeds to 250. At 250, a determination is made whether a child button, i.e., one of the keybutton LEDs 59, has been pushed. If not, control proceeds to 262. At 262, the power of the parent unit 42 is set to full. Control then proceeds to 264, at which a normal poll message is sent. Control then proceeds to 266, at which a determination is made whether the parent unit 42 has received a response from the child units 44. If not, control proceeds to 260. If so, control proceeds to 268. At 268, the parent unit 42 is set to its normal mode and control then proceeds to 110. If a child button has been pushed, control proceeds to 300 (FIG. 34).

At 300 the parent unit 42 reads the RSSI signal strength until a suitable value is obtained. Control is then passed to 304. At 304 the first antenna is selected and the circuit is tuned by adjusting the D/A until a maximum value from the output of the detector 632 is obtained. The proper analog value is saved and set up in the D/A circuit. At 314 antenna #2 is set and the same procedure is used for detector output 634. Control proceeds through blank node 326 FIG. 34. Control is then passed to 270. At 270, the parent unit 42 reads the PHASE_DET and control proceeds to 272. At 272, a determination is made whether the analog value indicates left, right or center. If the value is left, control proceeds to 274. At 274, the left counter is bumped and control proceeds to 281. If not, control proceeds to 276. At 276, a determination is made whether the child unit is positioned to the right of the parent unit 42. If so, control proceeds to 278, at which the direction finder right counter is bumped. Control then proceeds to 281. If not, control proceeds to 280. At 280, the direction finder is bumped to the center and control proceeds to 281. At 281, a determination is made whether the parent unit 42 has performed 4000 reads. If not, control proceeds to 250. If so, control proceeds to 290.

Figure 34:
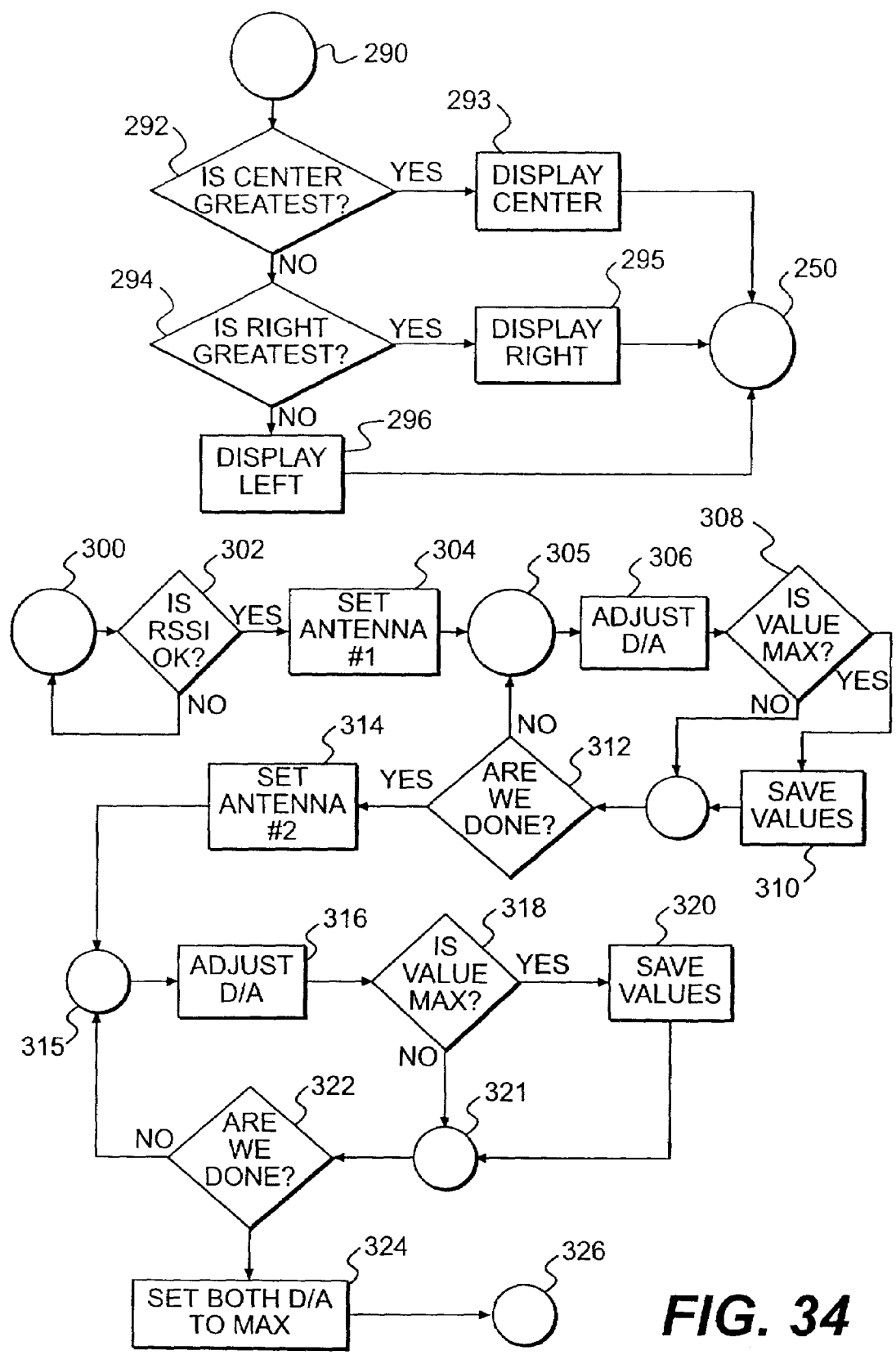
FIG. 34 is a flow chart illustrating operations performed during direction display in accordance with the exemplary embodiment of the invention.

FIG. 34 At 290, control proceeds to 292. At 292, it is determined whether the center voltage is the greatest. If so, control proceeds to 293. At 293, the center LED is displayed and control proceeds to 250. If the center is not the greatest, control proceeds to 294. At 294, it is determined whether the right voltage is the greatest. If so, control proceeds to 295. At 295, the right LED is displayed and control proceeds to 250. If the right voltage is not the greatest, control proceeds to 296. At 296, the left LED is displayed and then control proceeds to 250.

Figure 35:
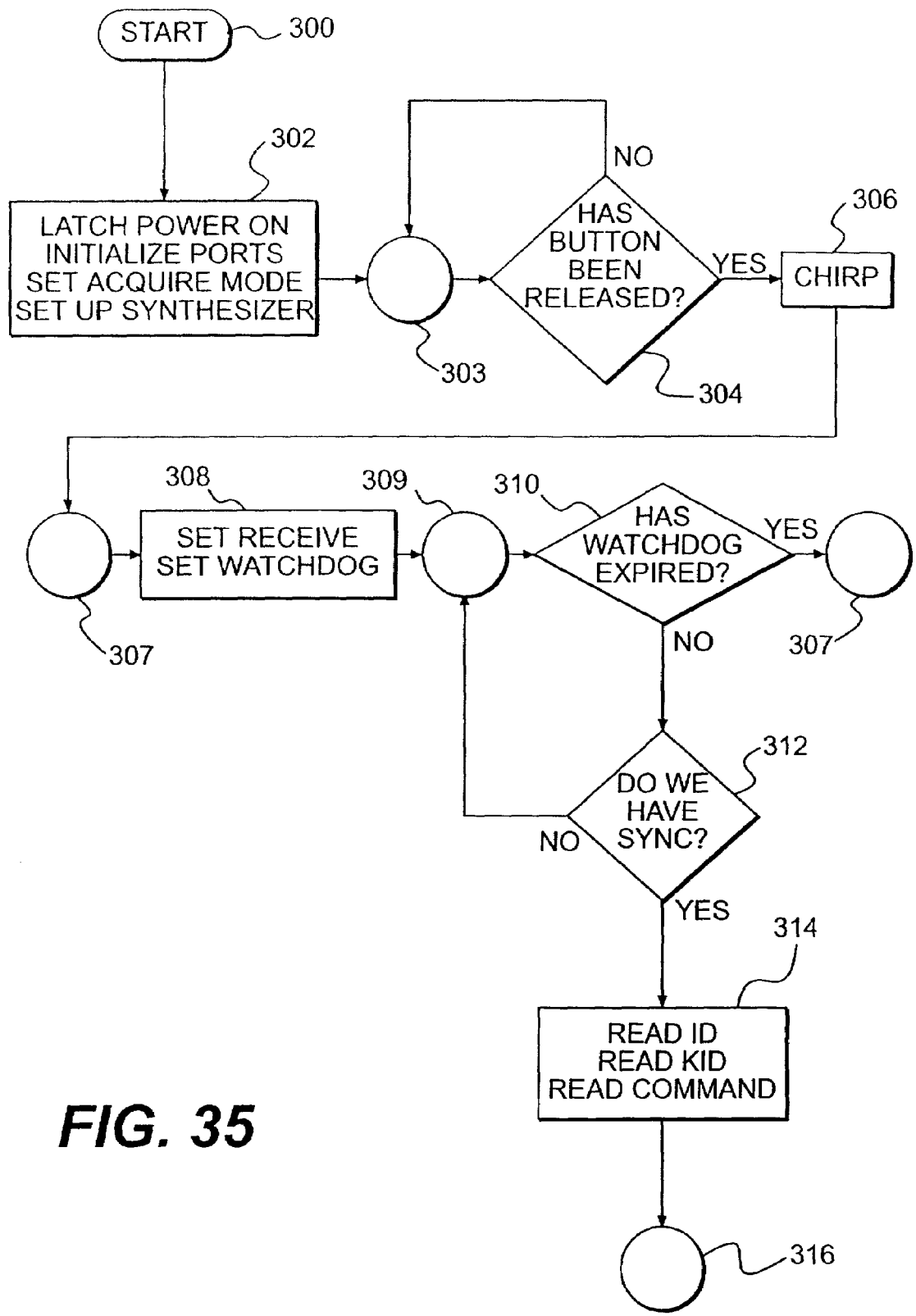
FIG. 35 is a flow chart illustrating operations performed during initialization of the child unit.

FIG. 35 illustrates operations performed during power up sequence of the child unit 44 in accordance with the exemplary embodiment of the invention. The operations begin at 300 and control proceeds to 302. At 302, the power is latched on, the ports are initialized, acquire mode is set and the frequency synthesizer 710 (FIGS. 3 and 14) is set up. Control then proceeds to 303. At 303, a blank node allows control to proceed to 304, at which a determination is made whether the power button (S8, S9) has been released. If the power button (S8, S9) is released, control proceeds directly to 306. If not, control proceeds to 303. At 306, the child units 44 may chirp through speaker 71 to acknowledge that the power button (S8 or S9) has been released and control proceeds to 308 through blank node 307. At 308, the child unit 44 is set to receive mode and a watchdog is set, where the child unit 44 looks for signals transmitted from the parent unit 42. Control then proceeds to 310 through a blank node 309. At 310, it is determined whether there is a synchronization, i.e., using the clocks 57 of the respective microprocessor units 720, 510 of child unit 44 and the parent unit 42. If not, control proceeds to blank node 309. If so, control then proceeds to 314, at which the child unit 44 reads the ID code 46, reads the assigned kid number which the child unit 44 has been assigned to by the parent unit 42, and reads commands or messages from the parent unit 42. Control proceeds to blank node 316.

Figure 36:
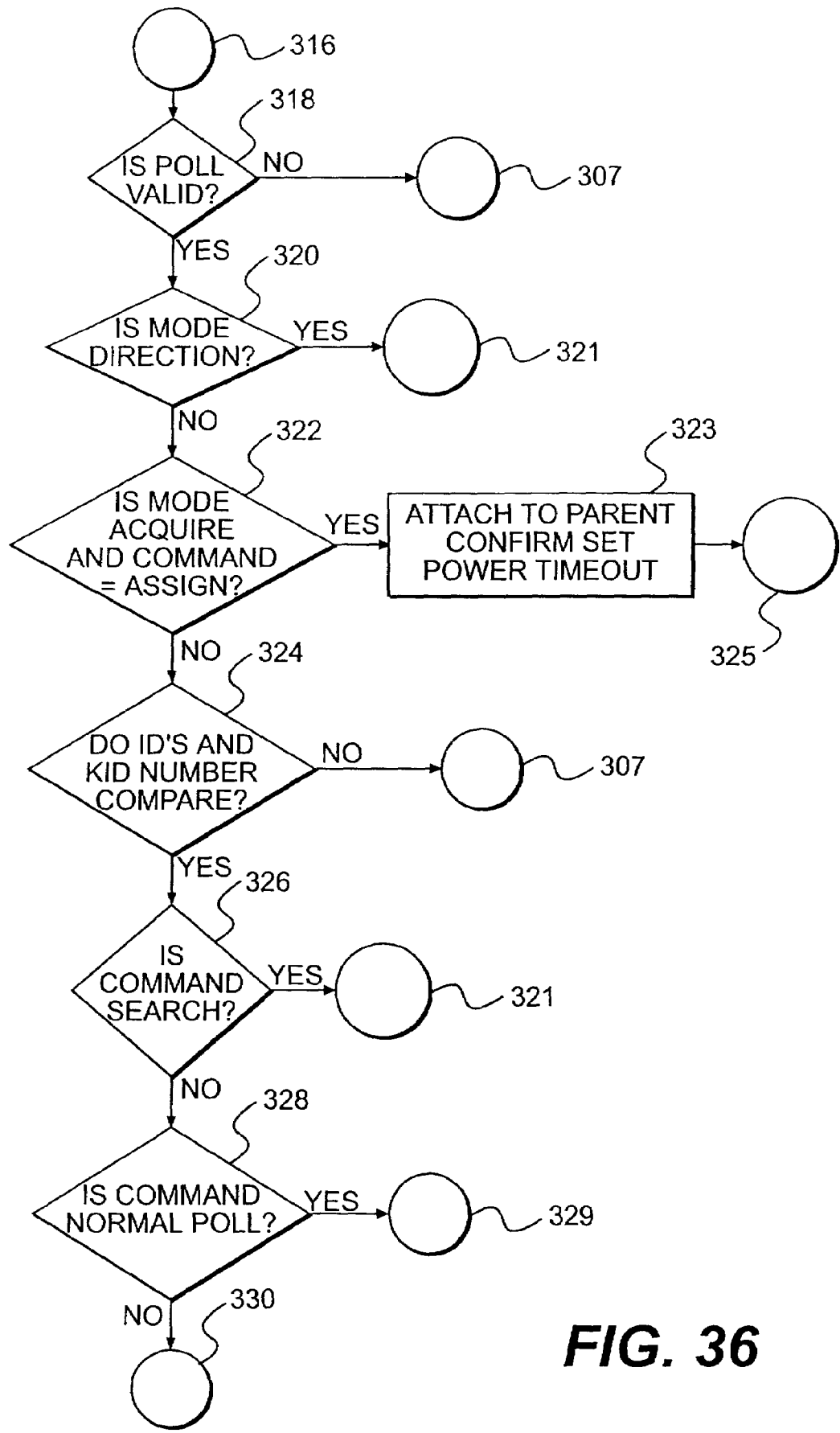
FIG. 36 is a flow chart illustrating further operations performed from FIG. 33 by the child unit when interpreting commands from the parent unit.

In FIG. 36, control proceeds from the blank node 316 to 318. At 318, it is determined whether the poll command or message transmitted from the parent unit 42 is valid. If not, control proceeds to blank node 307. If so, control then proceeds directly to 320. At 320, it is determined whether the parent unit 42 is trying to detect the direction of the child unit 44. If so, control proceeds to operation 321. If not, control then proceeds directly to 322. At 322, it is determined whether the child unit 44 is in acquire mode, and whether the command from the parent unit 42 is assign. If not, control proceeds to 324. If so, control proceeds to 323, at which the child unit 44 confirms the assignment to the parent unit 42 and also sets a timeout to conserve power, whereby the circuit 54 will power down after a predetermined amount of inactivity. Control then proceeds to blank node 325.

At 324, it is determined whether the ID codes 46 and the child numbers transmitted from the parent unit 42 compare to those assigned to each of the child units 44. If not, control proceeds to blank node 307. If so, control proceeds to 326, at which it is determined whether the command transmitted from the parent unit 42 is search. If so, control proceeds to operation 321. If not, control proceeds to 328, at which it is determined whether the command transmitted from the parent unit 42 is normal poll, whereby the parent unit 42 transmits and receives one signal to each of the child units 44. If not, control proceeds to blank node 330. If so, control then proceeds to operation 329.

Figure 37:
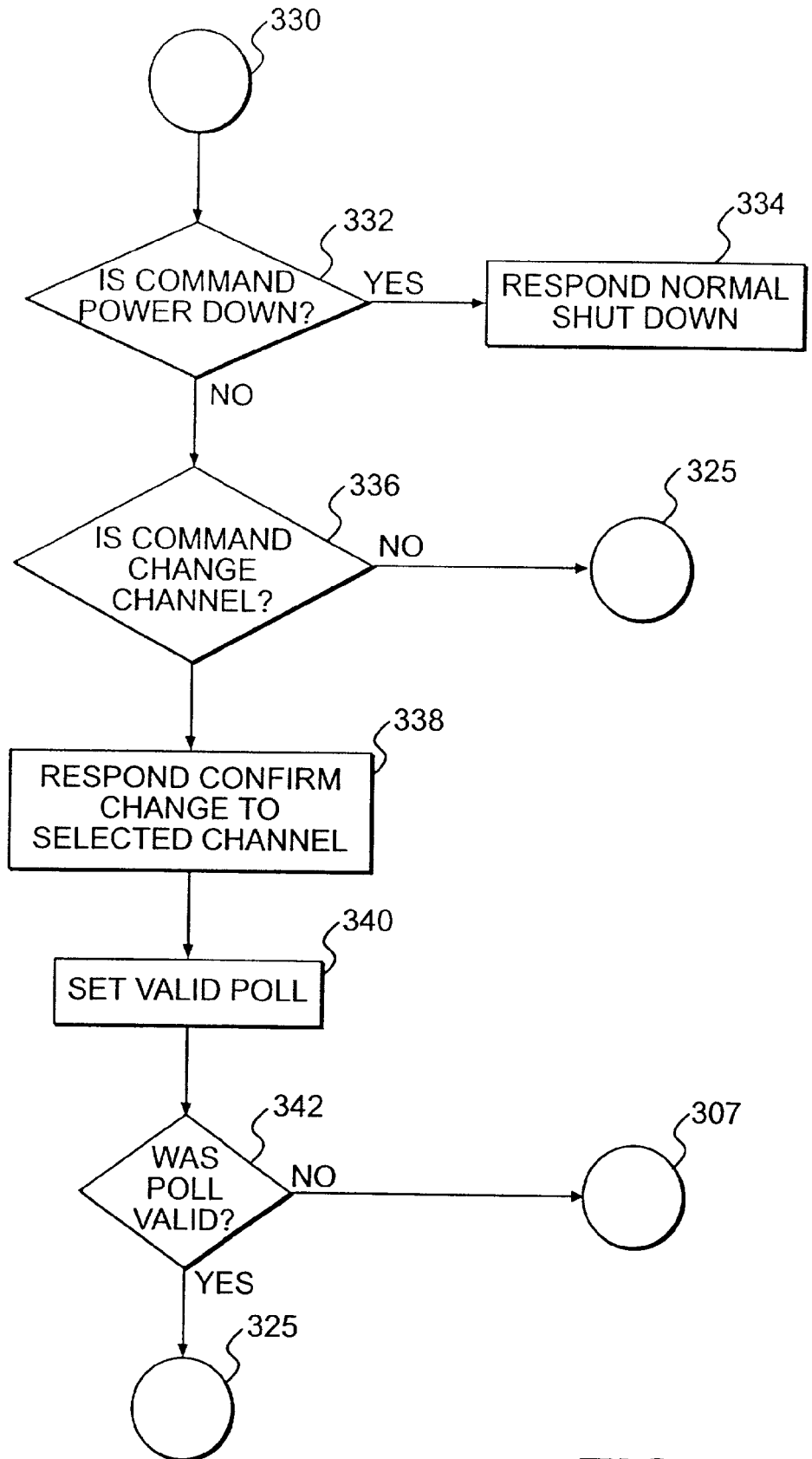
FIG. 37 is a flow chart illustrating further operations performed from FIG. 36 by the child unit when interpreting commands from the parent unit.

FIG. 37 shows control proceeding from blank node 330 to 332. At 332, it is determined whether the command transmitted from the parent unit 42 is power down. If so, control proceeds to 334. If not, control proceeds directly to 336. At 334, the child unit 44 transmits a normal response to the parent unit 42 and shuts down. At 336, it is determined whether the command transmitted from the parent unit 42 is change channel. If not, control proceeds to blank node 325. If so, control proceeds to 338. At 338, the child unit 44 responds to the parent unit 42 that the command is confirmed and the child unit 44 changes to a selected channel, which may be selected, for example, by implementing the method illustrated in FIG. 23 via the frequency synthesizers 520, 710. Control then proceeds to 340, at which a valid poll is set by the child unit 44. Control proceeds directly to 342. At 342, it is determined whether the poll was valid. If not, control proceeds to blank node 307. If so, control proceeds to 325.

Figure 38:
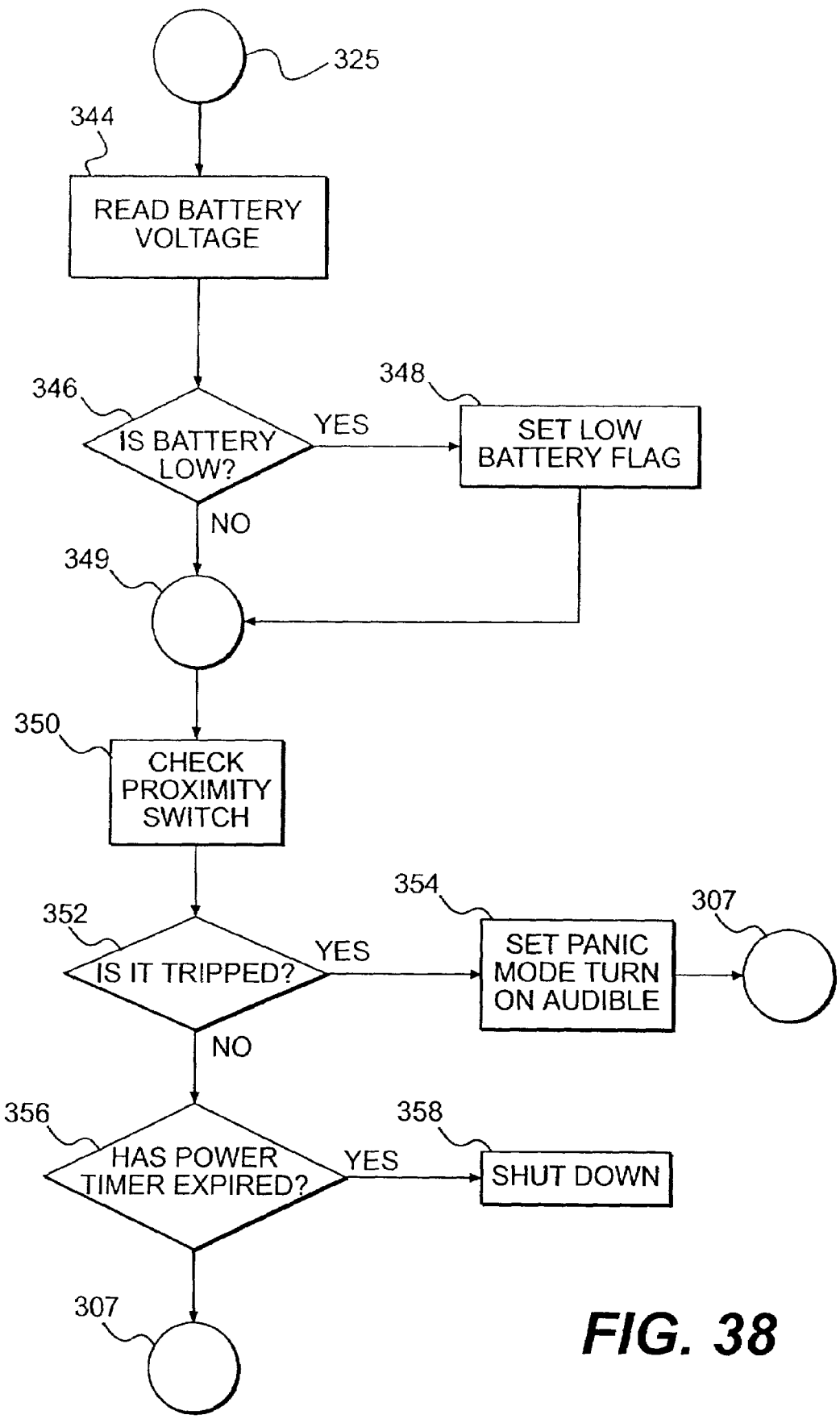
FIG. 38 is a flow chart illustrating further operations performed during checking the status condition of the child unit from FIG. 35.

FIG. 38 illustrates control proceeding from blank node 325 to 344. At 344, the battery voltage of the child unit 44 is read and control proceeds to 346. At 346, it is determined if the battery is low, for example, using the low battery detection circuit 74. If so, control proceeds to 348, at which a low battery flag is set, and control proceeds to blank node 349. If not, control proceeds to blank node 349. From blank node 349, control proceeds to 350. At 350, the status of the proximity switch (i.e., the proximity detection circuit 84 or the water detection circuit 85) is checked and control proceeds to 352. At 352, it is determined whether the proximity switch has been tripped. If not, control proceeds to 356. If so, control proceeds to 354. At 354, the panic mode is set and the speaker 71 is turned on. Control then proceeds to blank node 307. At 356, it is determined whether the predetermined time limit has expired. If so, control proceeds to 358 where the child units 44 are shut down. If not, control proceeds to blank node 307.

Figure 39:
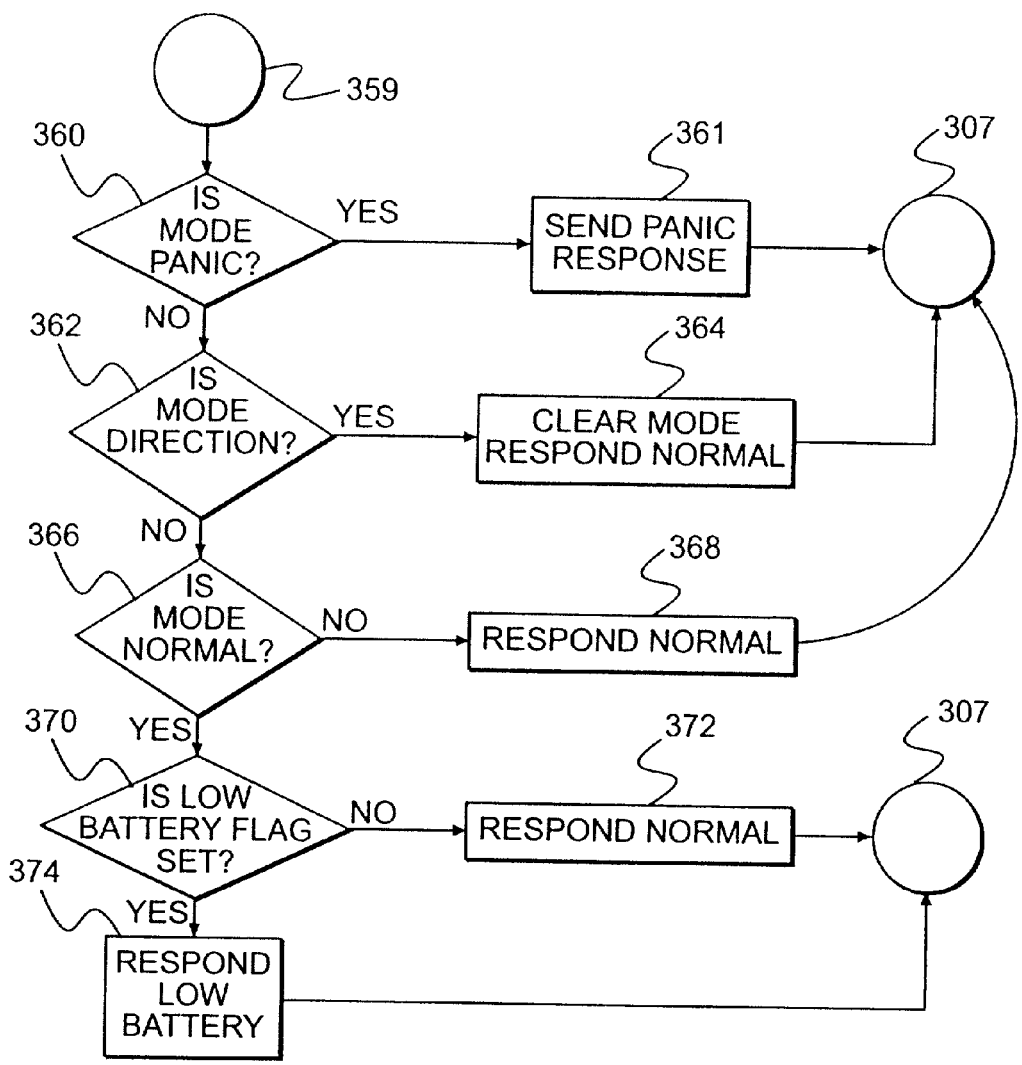
FIG. 39 is a flow chart detailing step 329 shown in FIG. 36.

FIG. 39 illustrates the operation 329. The operation 329 begins at blank node 359. Control then proceeds from the blank node 359 to 360. At 360, it is determined whether the child unit 44 is in panic mode via pressing the help button (S9). If so, control proceeds to 361. If not, control proceeds to 362. At 361, the child unit 44 transmits a panic response to the parent unit 42 and control then proceeds to blank node 307. At 362, it is determined whether the parent unit 42 is in direction detection mode. If so, control proceeds to 364. If not, control proceeds to 366. At 364, the mode is cleared, the child unit 44 responds normally to the parent unit 42 and control then proceeds to blank node 307. At 366, it is determined whether the unit is in normal mode. If not, control proceeds to 368. If so, control proceeds to 370. At 368, a normal response is transmitted to the parent unit 42 and control then proceeds to blank node 307. At 370, it is determined whether a low battery flag has been set. If not, a normal response is transmitted to the parent unit 42 and control then proceeds to blank node 307. If so, control proceeds to 374, at which a low battery response is transmitted to the parent unit 42 and control then proceeds to blank node 307. When control proceeds to blank node 307 from either 361, 364, 368 or 372, the operation 329 ends.

Figure 40:
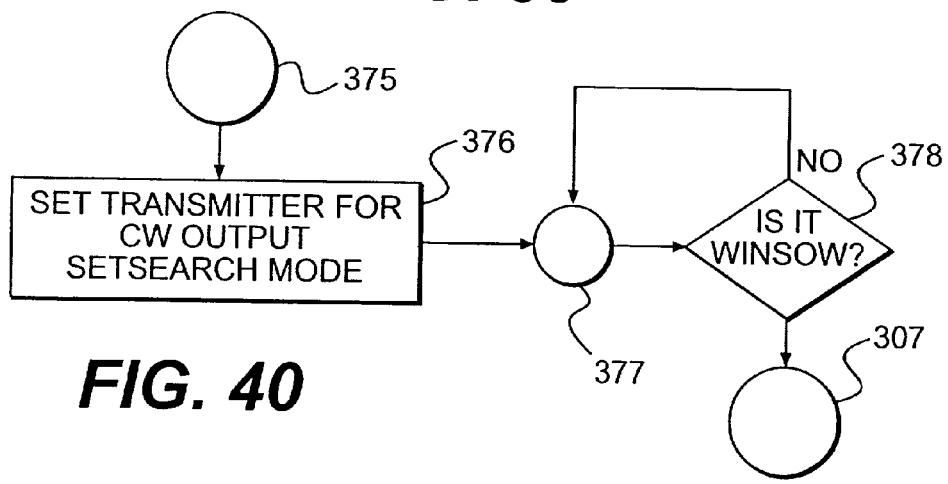
FIG. 40 is a flow chart detailing step 321 shown in FIG. 36.

FIG. 40 further illustrates operation 321. The operation 321 begins at blank node 375 and control proceeds from blank node 375 to 376. At 376, the antenna 80 in the child unit 44 is set for continuous wave output, the search mode of the child unit 44 is set and control proceeds directly to blank node 377. From blank node 377, control proceeds to 378. At 378, it is determined whether the child unit 44 is "window time", whereby the child unit 44 searches for commands or messages transmitted from the parent unit 42, such as those described above. If so, control proceeds to blank node 307 and the operation 321 ends. If not, control proceeds to blank node 377.

As described above, the parent unit 42 continuously polls the child units 44 and may select a different operating channel at any time to avoid interference with other apparatuses 40. That way, the child units 44 are less likely to become lost or to lose communication with the parent unit 42.

After the user finishes using the device 40, the parent unit 42 and the child units 44 may be powered off and stored until the next usage as described above.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all such modifications.

We claim:

1. A monitoring and locating device comprising:
at least one portable child unit; and
a parent unit in communication with the portable child unit, the parent unit being configured to assign an individual identifier to each portable child unit by wireless radio frequency signal and configured to monitor each of the portable child units by transmitting and receiving signals to each of the portable child units based on the individual identifiers assigned thereto the parent and child units being configured to provide directional information as to a position of the child units with respect to the parent unit and a perimeter alarm when the child unit moves to a distance from the parent unit that is greater than a predetermined distance; and a directional display coupled to a microprocessor constructed and arranged to display the position of a selected child unit relative to the parent unit based on phase differential signals generated by the microprocessor for the selected child unit; and an operating channel selection circuit coupled to the microprocessor, the operating channel selection circuit constructed and arranged to select an operating channel on a frequency band for the parent unit to transmit or receive thereon.

2. The monitoring and locating device according to claim 1, wherein each individual identifier is an 8 bit number generated by the parent unit, each 8 bit number including 6 bits assigned by the parent unit and 2 bits representing an identifier for individual child units.

3. The monitoring and locating device according to claim 1, wherein the parent unit includes:
a microprocessor configured to generate identifier commands representative of the individual identifiers to be transmitted to a plurality of portable child units; a power supply coupled to the microprocessor to supply power thereto; a power control circuit coupled to the microprocessor and to the power supply, the power control circuit being configured to regulate power supplied from the power supply to the microprocessor; a transceiver system coupled to the microprocessor, the transceiver system; two separate antennae constructed and arranged to transmit a command signal and the individual identifiers to each child unit and to receive a received signal from each child unit; a direction detection circuit, coupled to the transceiver system and the microprocessor, the direction detection circuit configured to receive the identifier commands from the microprocessor and to generate phase differential signals indicative of a corresponding relative position of each child unit relative to the parent unit in response to interpreting the received signals from each of the child units.

4. The monitoring and locating device according to claim 2, wherein a child unit includes: a second microprocessor supplied with the respective identifier for each of the portable transmitter units, the microprocessor being constructed and arranged to generate a control signal representative of the respective individual identifier supplied thereto; a second power supply operatively coupled to the second microprocessor to supply power thereto; a second power control circuit operatively coupled to the second microprocessor and to the second power supply, the second power control circuit being configured to regulate power supplied to the second microprocessor; a second transceiver system operatively coupled to the second microprocessor; an antenna configured to receive the individual identifier and the command signals from the first transceiver system and to transmit a received signal to the first transceiver system through the second transceiver system; an actuated circuit operatively coupled to the second microprocessor, the actuated circuit being configured to generate a signal which is transmitted to the parent unit using the second transceiver system; and a plurality of sensing circuits operatively coupled to the second microprocessor, each of the plurality of sensing circuits being configured to sense a certain object.

5. The monitoring and locating device according to claim 1, wherein the parent unit is in radio frequency communication with each of the child units and the individual identifiers include a modulated RF signal carried by a RE carrier signal generated by the first microprocessor.

6. A method for monitoring a plurality of portable transmitters in radio frequency communication with a control unit, the method comprising: identifying each portable transmitter, each identifying operation including the control unit assigning and transmitting an individual identifier to each portable transmitter by wireless radio frequency signal, each of the plurality of portable transmitters receiving the individual identifier and sending an acknowledgement signal to the control unit, the control unit receiving each of the acknowledgement signals and activating each of the plurality of portable transmitters for monitoring; and monitoring the portable transmitter, each monitoring operation includes the control unit selecting an operating channel and sending monitoring commands to each portable transmitter unit and the control unit receiving and monitoring received signals transmitted from each of the plurality of portable transmitter units.

7. The method according to claim 6, further comprising tracking at least one of the plurality of portable transmitters, each tracking operation includes the control unit sending search commands to each of the plurality of portable transmitter unit.

8. The method according to claim 7, further comprising locating at least one of the plurality of portable transmitters after the tracking operation.

* * * * *